(12) United States Patent
Fan et al.

(10) Patent No.: US 9,763,055 B2
(45) Date of Patent: Sep. 12, 2017

(54) TRAVEL AND ACTIVITY CAPTURING

(71) Applicant: Regents of the University of Minnesota, Minneapolis, MN (US)

(72) Inventors: Yingling Fan, Minneapolis, MN (US); Julian Wolfson, Minneapolis, MN (US); Gediminas Adomavicius, Minneapolis, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

(21) Appl. No.: 14/836,317

(22) Filed: Aug. 26, 2015

(65) Prior Publication Data

US 2016/0066155 A1    Mar. 3, 2016

Related U.S. Application Data

(60) Provisional application No. 62/041,959, filed on Aug. 26, 2014.

(51) Int. Cl.
| | |
|---|---|
| *H04W 24/00* | (2009.01) |
| *H04W 4/02* | (2009.01) |
| *H04W 4/04* | (2009.01) |
| *G06F 3/0484* | (2013.01) |
| *G01C 21/30* | (2006.01) |

(52) U.S. Cl.
CPC .......... *H04W 4/027* (2013.01); *G06F 3/0484* (2013.01); *H04W 4/04* (2013.01); *G01C 21/30* (2013.01)

(58) Field of Classification Search
CPC ....... H04W 4/027; H04W 4/04; G06F 3/0484; G01C 21/30

USPC ................... 455/457, 456.1–456.3; 370/338
See application file for complete search history.

(56) References Cited

U.S. PATENT DOCUMENTS

| | | | | |
|---|---|---|---|---|
| 2003/0225589 | A1* | 12/2003 | Eaton | G06Q 10/10 709/207 |
| 2008/0059061 | A1* | 3/2008 | Lee | G01C 21/3423 701/412 |
| 2011/0218731 | A1* | 9/2011 | Ando | G01C 21/20 701/408 |
| 2013/0282269 | A1* | 10/2013 | Hannukainen | G01C 21/3484 701/400 |
| 2015/0350833 | A1* | 12/2015 | Kazemi | H04W 4/028 455/456.6 |

OTHER PUBLICATIONS

Abdulazim, et al., Using Smartphones and Sensor Technologies to Automate Collection of Travel Data, Journal of the Transportation Research Board, 2013, vol. 2383, pp. 44-52.

(Continued)

*Primary Examiner* — Marcos Batista
(74) *Attorney, Agent, or Firm* — Theodore M. Magee; Westman, Champlin & Koehler, P.A.

(57) ABSTRACT

A mobile device includes a positioning module sampling at least a position of the mobile device at a sampling rate when active and a processor capable of determining whether a mobile device is travelling or dwelling based on at least the sampled position of the mobile device. The processor further identifies a travel mode for a trip segment for the mobile device based on at least the sampled position of the mobile device when the mobile device is travelling and identifies an activity when then the mobile device is dwelling.

19 Claims, 22 Drawing Sheets

(56) References Cited

OTHER PUBLICATIONS

Android developer reference, http://developer.android.com/reference/android/net/wifi/WiFiInfo.html, accessed Jul. 2015, 1 page.
Auld et al., An automated GPS-based prompted recall survey with learning algorithms, Transportation Letters: The International Journal of Transportation Resarch, 2009, vol. 1, No. 1, pp. 59-79.
Barbeau et al., Integration of GPS-enabled mobile phones and AVL: personalized real-time transit navigation information on your phone, Proceedings of the National Academy of Sciences, Transportation Research Board 89th Annual Meeting, Washington, D.C., 2009, pp. 1-21.
Biljecki et al., Transportation mode-based segmentation and classification of movement trajectories, International Journal of Geographical Information Science, 2013, vol. 27, No. 2, pp. 385-407.
Bohte et al., Deriving and validating trip purposes and travel modes for multi-day GPS-based travel surveys: a large-scale application in the Netherlands, Transportation Research Part C: Emerging Technologies, 2009, vol. 17, No. 3, pp. 285-297.
Breiman, Random forests, Machine Learning, 2001, vol. 45, No. 1, pp. 5-32.
Cao et al., A novel temperature compensation method for a MEMS gyroscope oriented on a periphery circuit, International Journal of Advanced Robotic Systems, 2013, vol. 10, pp. 1-11.
Carroll et al., An analysis of Power Consumption in a Smartphone, In USENIX Annual Technical Conference, Boston, MA, 2010, pp. 1-14.
Chen, et al., An improved algorithm to generate a Wi-Fi fingerprint database for indoor positioning, Sensors, 2013, vol. 13, pp. 11085-11096.
CycleTracks, San Francisco County Transportation Authority, http://www.sfcta.org/modeling-and-travel-forecasting/cycletracks-iphone-and-android, 2013, 1 page.
Etteman, et al., Effects of data collection methods in travel and activity research, 1996, abstract only, 1 page.
Fan et al., Smartphone-based travel experience sampling and behavior intervention among young adults, Intelligent Transportation Systems Institute, Center for Transportation Studies, University of Minnesota, Retrieved from http://www.cts.umn.edu/publications/researchreports/reportdetail.html?id=2142, 2012, 101 pages.
Fan et al., UbiActive: a smartphone-based tool for trip detection and travel-related physical activity assessment, Transportation Research Board 92nd Annual Meeting, Paper of compendium, Washington, D.C., 2013, pp. 1-19.
Fan et al., SmarTrAC: A smartphone solution for context-aware travel and activity capturing, Final Report, Dynamic Mobility Applications Program, U.S. Department of Transportation Federal Highway Administration, Washington, D.C. 2015, pp. 1-102.
Flamm et al., Combining person based GPS tracking and prompted recall interviews for a comprehensive investigation of travel behaviour adaption processes during life course transitions, paper presented at the 11th World Conference on Transportation Research, Berkeley, 2007, pp. 1-16.
Friedman, Greedy function approximation: a gradient boosting machine, The Annals of Statistics, 2001, vol. 29, No. 5, pp. 1189-1232, retrieved from http://citeseerx.ist.psu.edu/viewdoc/summary?doi=10.1.1.29.9093.
Gong et al., A GPS/GIS method for travel mode detection in New York City, Computers, Environment and Urban Systems, 2012, vol. 36, No. 2, pp. 131-139.
Guensler et al., Analysis of commute Atlanta instrumented vehicle GPS data: destination choice behavior and activity spaces, paper presented at the Transportation Research Board 85th Annual Meeting (Jun. 1983, 2006, pp. 1-24.
Hache et al., Mobility change-of-state detection using a smartphone-based approach, Medical Measurements and Applications Proceedings, (MEMEA), IEEE International Workshop on, 2010, pp. 43-46.
Hektner et al., Experience sampling method: measuring the quality of everyday life, Sage, http://www.sagepub.in/books/Book228179, 2007, 1 page.
Hothom et al., Unbiased recursive partitioning: a conditional inference framework, Journal of Computational and Graphical Statistics, 2006, vol. 15, No. 3, pp. 651-674.
Jaccard, The distribution of the flora in the alpine zone, New Phytologist, 1912, vol. 11, No. 2, pp. 37-20.
Jariyasunant et al., Quantified traveler: Travel feedback meets the cloud to change behavior, Journal of Intelligent Transportation Systems, 2014, 26 pages.
Lee-Gosselin et al., Internet-based prompted recall diary with automated GPS activity-trip detection: System design, paper presented at the Transportation Research Board 85th Annual Meeting, 2006, 23 pages.
Li et al., Web-based GIS system for prompted recall of GPS-assisted personal travel surveys: system development and experimental study; paper presented at the Transportation Research Board 87th Annual Meeting, 2008, 16 pages.
Liao, Using smartphone app to support visually impaired pedestrians at signalized intersection crossings, Transportation Research Record, 2013, No. 2393, pp. 12-20.
Liu et al., A hybrid smartphone indoor positioning solution for mobile LBS, Sensors 2012, 12, 17208-17233.
Liu et al., Robust optimization of a MEMS accelerometer considering temperature variations, Sensors 2015, vol. 15, 6342-6359, http://www.mdpi.com/1424-8220/15/3/6342/pdf, accessed 2015.
Loh, Classification and regression of trees, Wiley Interdisciplinary Reviews: Data Mining and Knowledge Discovery, , vol. 1, No. 1, pp. 14-23, Jan. 2011.
McGowen, Evaluating the potential to predict activity types from GPS and GIS data, Paper presented at the Transportation Research Board 86th Annual Meeting, Washington, 2007, 27 pages.
Navarro et al., Wi-Fi localization using RSSI fingerprinting, California Polytechnic State University, 2011, http://digitalcommons.calpoly.edu/cpesp/17/, accessed 2015, 6 pages.
Nitsche, et al., Supporting large-scale travel surveys with smartphones—a practical approach, Transportation Research Part C: Emerging Technologies, 2014, vol. 43, 212-221.
Rajaraman, et al., Mining of massive datasets: Chapter 3, Cambridge University Press, New York, http://www.mmds.org/, accessed 2015.
Bricka, Origin-Destination Data Collection Technology, IGI Global, 2014, Chapter 1, pp. 1-90, Chapter 8, pp. 119-186 and Chapter 15, pp. 239-257.
Schlich et al., Habitual travel behaviour: evidence from a six-week travel diary, Transportation, 2003, vol. 30, pp. 13-36.
Schonfelder, et al., Exploring the potentials of automatically collected GPS data for travel behaviour analysis: a Swedish data source, Citeseer, 2002, 26 pages.
Schuessler, et al., Processing raw data from global positioning systems without additional information, Transportation Research Record: Journal of the Transportation Research Board, 2009, No. 2105, pp. 28-36.
Shafique et al., Using probe person data for travel mode detection, International Journal of Computer, Control, Quantum and Information Engineering, 2014, vol. 8, No. 10, pp. 1501-1505.
Shen et al., A process for trip purpose imputation for global positioning system data, Transportation Research Part C: Emerging Technologies, 2013, No. 36, pp. 261-267.
Smith, U.S. smartphone use in 2015, Report, Pew Research Center, http://www.pewinternet.org/2015/04/01/us-smartphone-use-in-2015/, 2013, accessed 2015.
Srinivasan et al., Conversion of Volunteer-Collected GPS Diary Data into Travel Time Performance Measures: Final Report, 2006, 66 pages.
Stopher et al., Search for a global positioning system device to measure person travel, Transportation Research Part C: Emerging Technologies, 2008, vol. 16, No. 3, pp. 350-369.
Tsui, An enhanced system for link and mode identifications for GPS-based personal travel surveys, University of Toronto, 2005, 185 pages.

(56) References Cited

OTHER PUBLICATIONS

Tsui et al., Enhanced system for link and mode identification for personal travel surveys based on global positioning systems, Transportation Research Record: Journal of the Transportation Research Board, 1972, pp. 38-45.
Vlassenroot, et al., The use of smartphone applications in the collection of travel behaviour data, International Journal of the Intelligent Transportation Systems Research, 2015, vol. 13, No. 1, pp. 17-27.
Wan et al., Life-space characterization from cellular telephone collected GPS data, Computers, Environment and Urban Systems, 2013, vol. 39, pp. 63-70.
Winters et al., Smart phone application to influence travel behavior (Trac-It Phase 3) No. 549-35, National Center for Transit Research for Florida Department of Transportation, Final Report, 2008, 144 pages.
Wolf et al., Elimination of the travel diary: experiment to derive trip purpose from global positioning system travel data. Transportation Research Record, Journal of the Transportation Research Board, 2001, 1768, Paper No. 01-3255, pp. 125-134.
Wolf et al., Eighty weeks of global positioning system traces: approaches to enriching trip information, Transportation Research Record: Journal of the Transportation Research Board, 2004, 1870(1), pp. 46-54.
Wu et al., Automated time activity classification based on global positioning system (GPS) tracking data, Environ Health, 2011, 10(101), pp. 1-13.
Xia et al., Using smart phone sensors to detect transportation modes, sensors, 2014, vol. 14, No. 11, pp. 20843-20865, https://www.mdpi.com/1424-8220/14/11/20843/pdf, accessed 2015.
Yurish, Smartphone sensing: what sensors would we like to have in the future smartphones? International Frequency Sensors Association (IFSA), Barcelona, Spain, NetWare 2012, Rome Italy, 46 pages.
Zhang, et al., Multi-stage approach to travel-mode segmentation and classification of GPS traces, paper presented at the ISPRS Workshop on Geospatial Data Infrastructure: from Data Acquisition and Updating to Smarter Services, 2011, 6 pages.
Zheng et al., Learning transportation mode from raw GPS data for geographic applications on the web, paper presented at the Proceedings of the 17th International Conference on World Wide Web, 2008, pp. 247-256.
Zhou, et al., Discoverying personally meaningful places: an interactive clustering approach, ACM Transactions on Information Systems (TOIS), 2007, vol. 25, No. 3, Article 12, 31 pages.
Du et al., Increasing the accuracy of trip rate information from passive multi-day GPS travel datasets: automatic trip end identification issues, Transportation Research Part A: Policy and Practice, vol. 41, No. 3, pp. 220-232, 2007.
Liao, et al., Extracting places and activities from GPS traces using hierarchical conditional random fields, The International Journal of Robotics Research, vol. 26, No. 1, pp. 119-134, 2007.
Moves-ProtoGeo, Helsinki and London-based startup, recently purchased by Facebook, https://www.moves-app.com. 1 page, accessed 2016.

\* cited by examiner

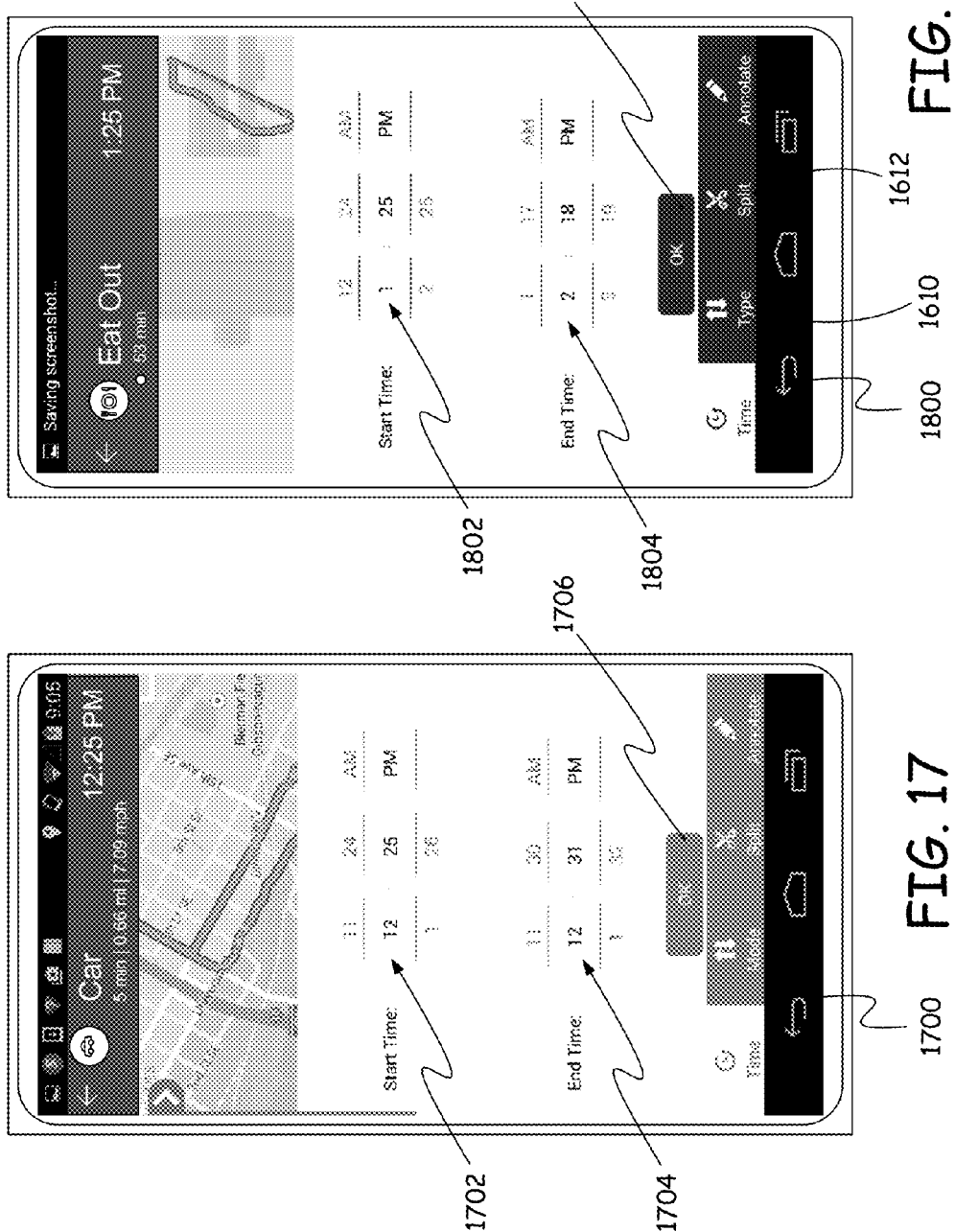

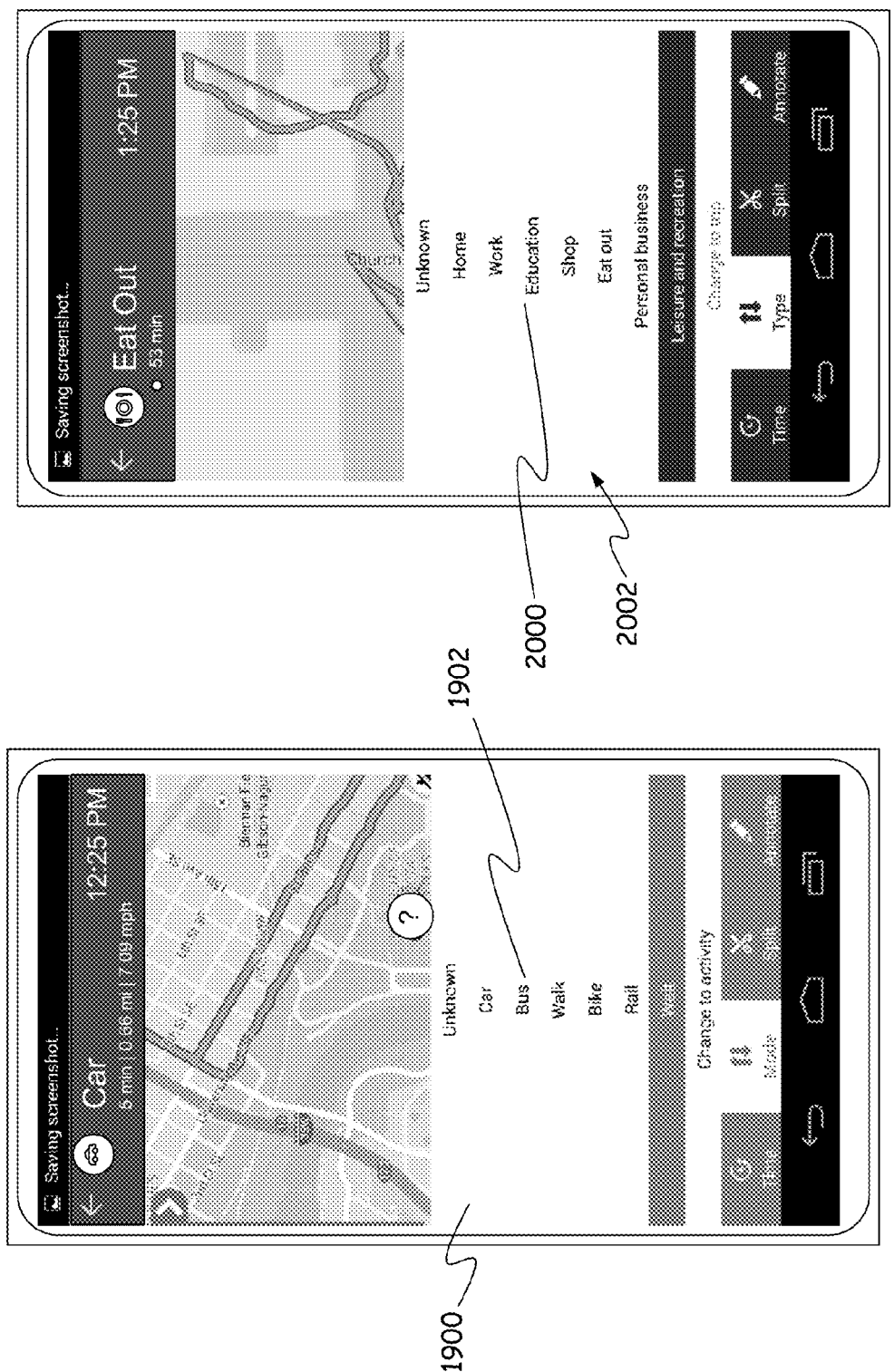

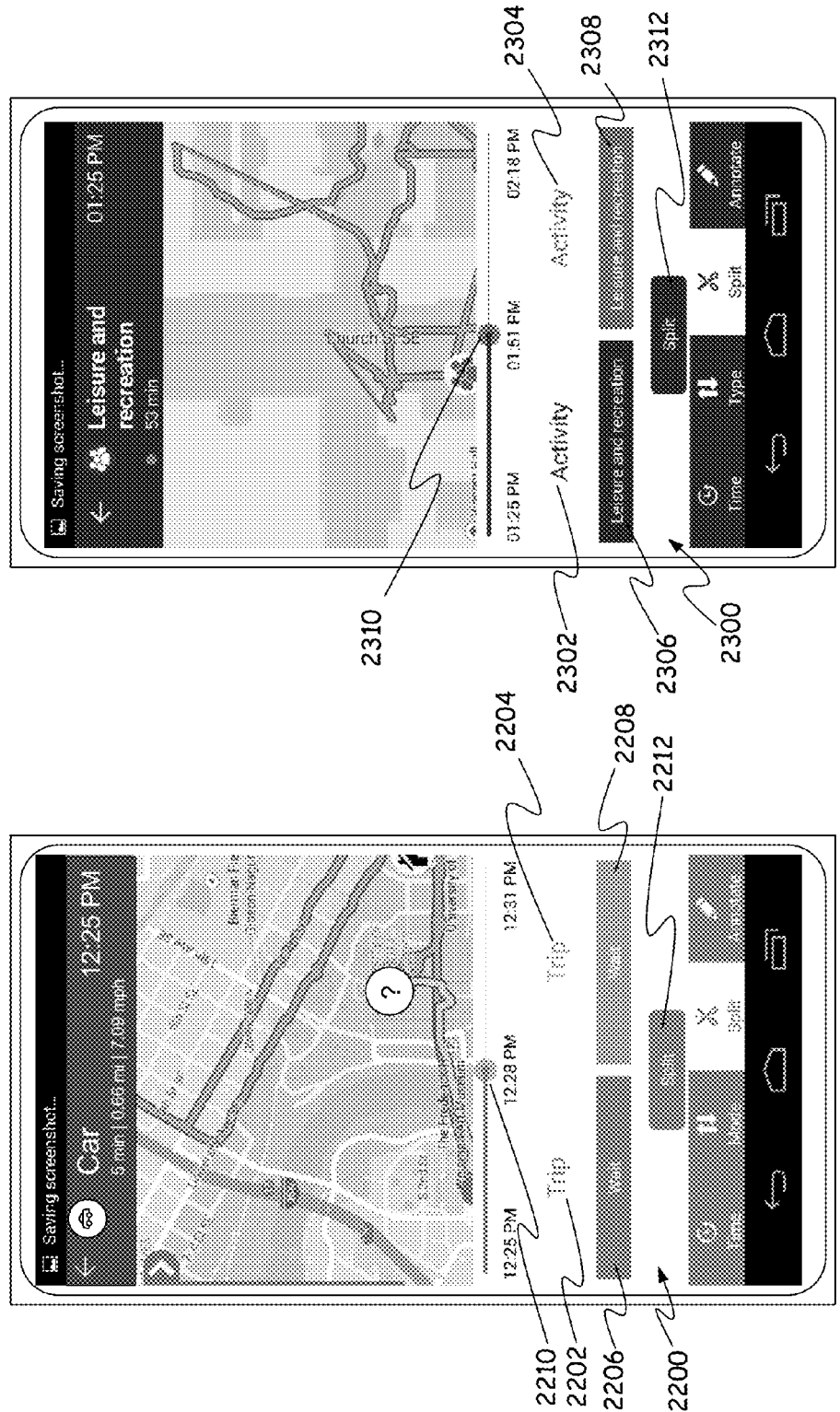

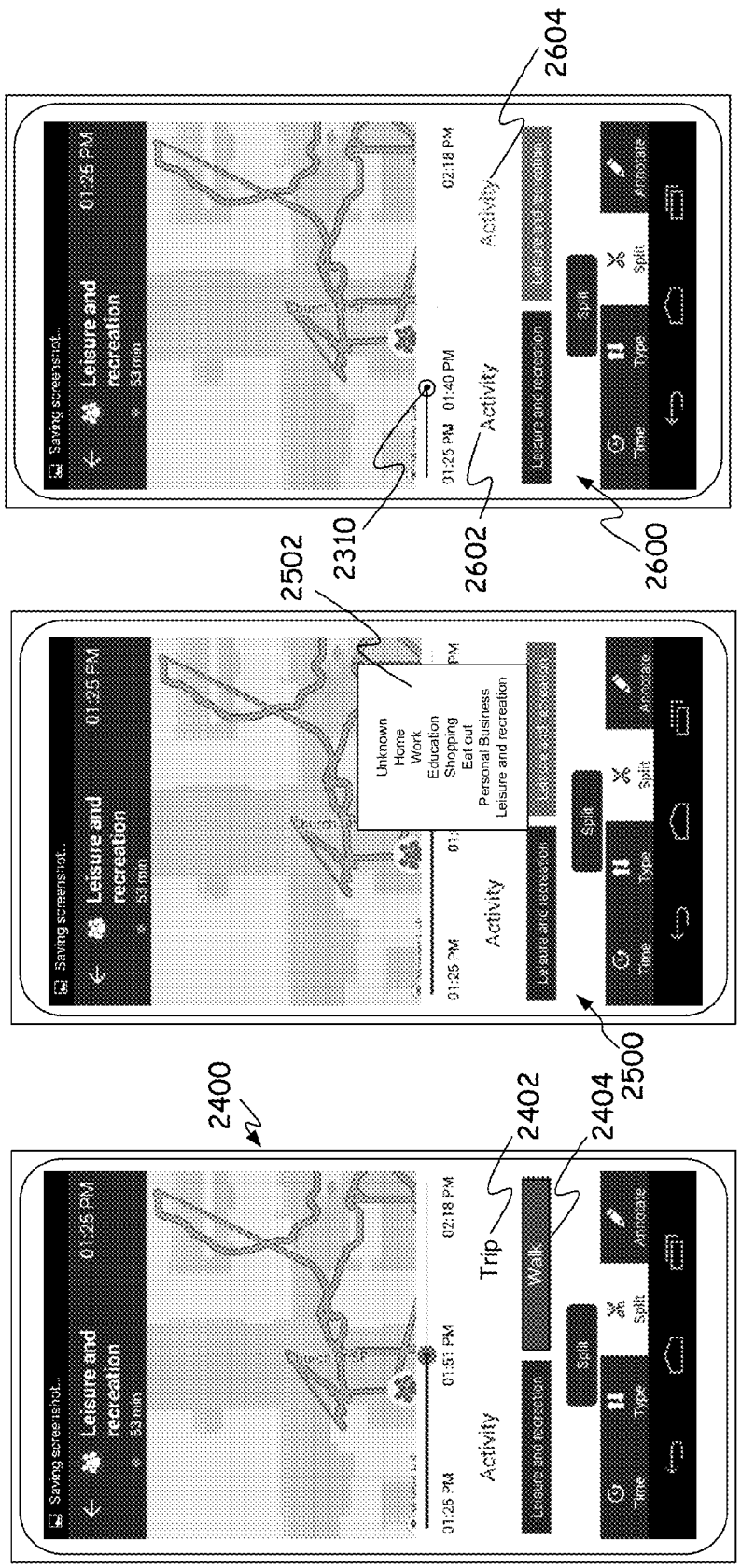

TRAVEL AND ACTIVITY CAPTURING

CROSS-REFERENCE TO RELATED APPLICATION

The present application is based on and claims the benefit of U.S. provisional patent application Ser. No. 62/041,959, filed Aug. 26, 2014, the content of which is hereby incorporated by reference in its entirety.

The Government has an interest in the patent as a result of funding derived from U.S. DOT/RITA Grant #DTRT57-13-C-10034.

BACKGROUND

City planners design roadways, mass transit systems, bike paths and walkways to help people move between their homes, worksites, schools, stores, restaurants, leisure and recreational sites and other locations. To understand how to best serve the needs of its citizens, cities and states must understand how people are currently traveling between locations and what activities they are performing at those locations. The accuracy of such information is critical to allocating the proper resources to address the community's needs.

SUMMARY

A mobile device includes a positioning module sampling at least a position of the mobile device at a sampling rate when active and a processor capable of determining a travel mode for a trip segment for the mobile device based on at least one sampling of the position of the mobile device.

In a further embodiment, a computer-readable medium having computer-executable instructions stored thereon is provided. The computer-executable instructions cause a processor to execute steps that include collecting information comprising at least one of position information, speed information, bearing/direction information and acceleration information from a positioning module in a mobile device containing the processor. The collected information is used to determine at least a travel mode for the mobile device. The travel mode is compared to a travel mode of at least one previous trip to identify a matching previous trip. A sampling rate of the positioning module is reduced based on identifying the matching previous trip.

In a further embodiment, a method on a mobile device includes identifying a dwelling episode and determining a location for the dwelling episode. The method then determines whether the user of the mobile device performed any activities within a set distance of the location of the dwelling episode. When the user of the mobile device performed at least one activity within the set distance of the location of the dwelling episode, the dwelling episode is classified as an activity type based on the at least one activity performed by the user instead of using a more processor-intensive technique to classify the dwelling episode as an activity type.

In a still further embodiment, a method of improving a computing system used to classify actions into travel modes and activity types is provided. The method includes classifying an action as one of an activity type and a travel mode and displaying controls to allow a user to divide the action into two temporally shorter actions such that the controls allow the user to classify each of the shorter actions into one of an activity type and a travel mode. Selections of the controls are received indicating how the user has classified the shorter actions. Based on how the user has classified the shorter actions, at least one method used by the computing system to classify actions into travel modes and activity types is enhanced.

BRIEF DESCRIPTION OF THE DRAWINGS

FIG. 17 shows a user interface for altering the start and/or end time of a selected travel period.

FIG. 18 provides a user interface for changing the start and/or end time of an activity.

FIG. 19 provides a user interface for changing a travel mode of a travel period.

FIG. 20 provides a user interface for changing an activity type of an activity.

FIG. 22 provides a user interface for splitting a travel period into two smaller periods.

FIG. 23 provides a user interface for splitting an activity period into two smaller periods.

FIG. 24 provides a user interface in which a sub-period is changed from an activity sub-period to a travel sub-period.

FIG. 25 provides a user interface in which an activity type for one of the sub-periods is selected.

FIG. 26 provides a user interface in which the time point between two smaller activity periods being formed from a larger activity period is defined.

DETAILED DESCRIPTION OF ILLUSTRATIVE EMBODIMENTS

Embodiments described below provide a system that uses mobile phones and other mobile devices that are currently already being carried by users to classify the user's movements or lack thereof into travel periods and dwelling periods. Further, the embodiments described below classify the travel periods into travel modes such as car, bus, bike, walk, in near real time. The embodiments also classify each dwelling period into an activity type after detecting that the dwelling period has ended. User interfaces are provided that allow the user to modify the classifications immediately after they are made or at any time that the user wishes. The user interfaces also allow the user to augment the classifications with additional information. Summaries of the user's travels and activities can be provided to the user through one or more user interfaces and can be uploaded to a central server to be used for a variety of purposes, including city planning, sociological and healthcare research, etc. Embodiments below improve the performance of the mobile device when detecting and classifying travel and dwelling periods. In particular, the embodiments improve battery usage of the mobile device by reducing the sampling rate of a positioning module to thereby extend the length of time that the mobile device can be used before recharging is needed. Embodiments also improve the operation of the mobile device in performing the classifications by refining the models based on feedback provided by the user through the user interfaces.

Figure 1:
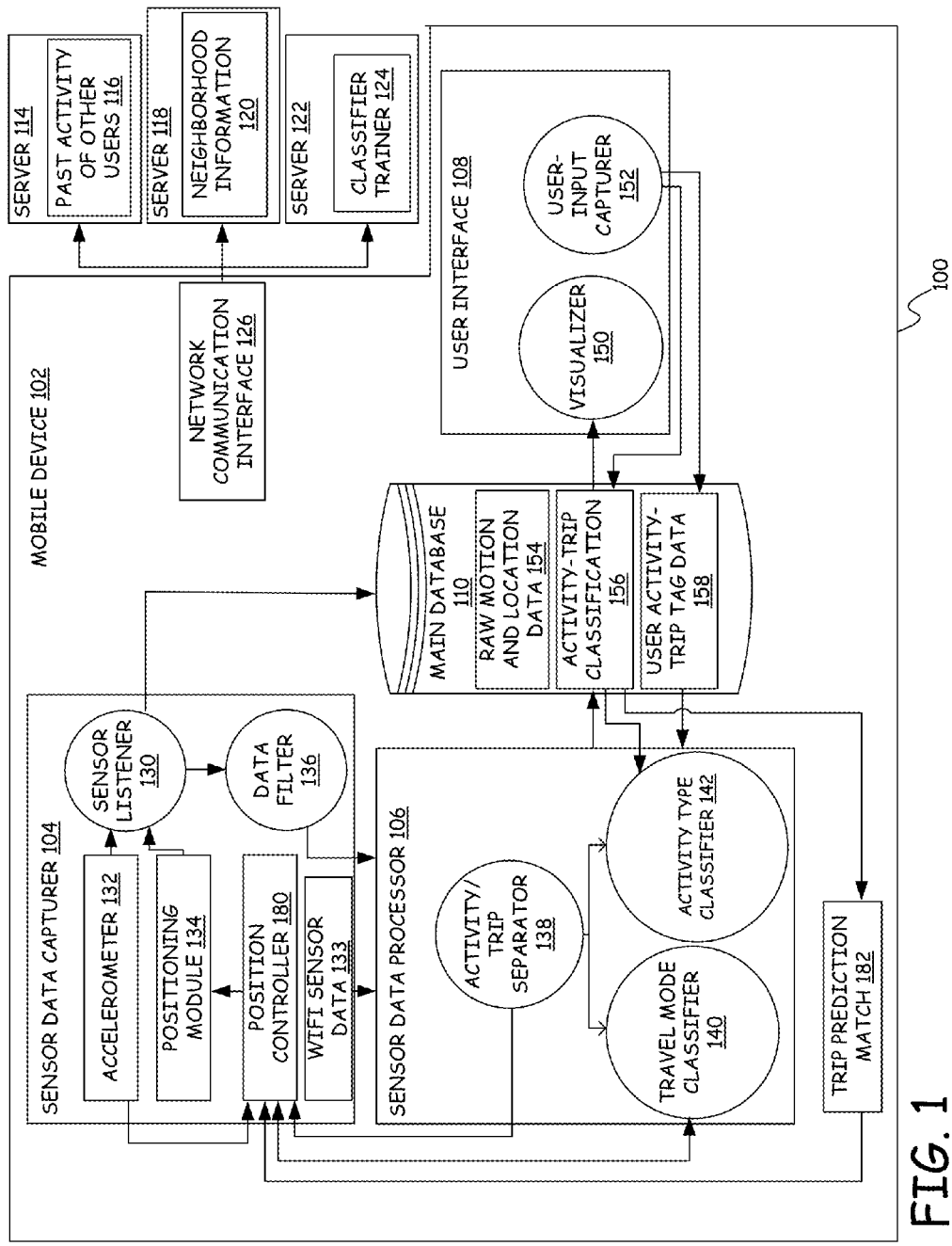
FIG. 1 is a block diagram of a travel/activity determination system.

FIG. 1 illustrates a high-level architecture diagram of a travel/activity detection system 100. System 100 includes a mobile device 102, which contains a sensor data capturer 104, a sensor data processor 106, a user interface 108, and a main database 110. System 100 also includes server 114, which contains past activity of other users 116; server 118, which contains neighborhood information 120; and server 122, which contains a classifier trainer 124. Mobile device 102 communicates with servers 114, 118 and 122 through a network communication interface 126, which can be a wired or wireless interface.

Sensor data capturer 104 is responsible for recording and filtering raw sensor data from mobile device 102's built-in sensors before the sensor data is provided to sensor data processor 106. Sensor data capturer 104 includes a sensor listener module 130 and a data filter module 136. Sensor listener 130 collects raw location and motion data from the built-in sensors, such as accelerometer 132 and positioning module 134, and provides the collected data to data filter 136. Sensor listener 130 also writes unfiltered raw motion and location data 154 at predetermined intervals to main database 110. In accordance with one embodiment, raw motion data is obtained five times per second (5 Hz), and raw location data is obtained once per second (1 Hz). When active, positioning module 134 provides position information such as time-stamped latitude, longitude, speed, accuracy, and bearing, for example. In accordance with one embodiment, positioning module 134 is a global positioning system, which uses signals from one or more satellites to determine the position and motion information. In other embodiments, positioning module 134 determines the position and motion information based on signals from cell towers of a cellular communicating network and/or wifi access points of wifi networks. The collected motion data from accelerometer 132 includes time-stamped linear acceleration readings on x, y, z axes relative to the phone.

Data filter 136 filters out poor quality location data based upon combined thresholds of accuracy, speed, and total acceleration (aggregate of raw linear accelerations along x, y, z axes mentioned above). In accordance with one embodiment, locations with precision greater than 100 meters, or with a speed above 500 meters per second, or with a total acceleration of greater than 15 meters per square second are removed.

Sensor data processor 106 is responsible for taking in the filtered location and motion data from data filter 136 and for deriving meaningful activity and travel behavior information from the data. Sensor data processor 106 consists of three real-time modules:

Activity/trip separator module 138 identifies whether the user is in the trip (travel) mode or activity (dwelling) mode at a current (or near-current, with a small time delay) time.

Travel mode classifier module 140 classifies travel into a travel mode at a current (or near-current, with a small time delay) time during trip episodes. The classification outcome can be any of the following six travel modes: car, bus, rail, wait, bike, and walk, in accordance with one embodiment.

Activity type classifier module 142 classifies a dwelling period into an activity type after completion of the dwelling period. The Activity type classifier module 142 can also be called a trip purpose classifier as it identifies the trip purpose of each trip episode after completion of the activity episode for which the trip was conducted. The activity type classifier outcome can be any of the following seven categories: home, work, education, shopping, eat out, social/recreation/community, and other personal businesses, in accordance with one embodiment.

User interface module 108 is responsible for displaying the predicted results from sensor data processor 106 and for allowing the user to correct the predictions and add additional information. User interface 108 consists of two real-time modules:

Visualizer module 150 displays episode-level activity and trip information predicted by sensor data processor 106, including travel mode and activity type predictions;

User-input capturer module 152 allows the user to correct the predicted episode-level activity/trip information and add additional information on daily activities and trips.

Main database 110 is responsible for storing and maintaining data. Besides raw location and motion data 154 harvested from sensor data capturer 104, main database 110 maintains the following two sets of data:

Instant activity-trip classifications 156 are obtained from sensor data processor 106. Activity/trip separator 138 identifies dwelling versus travel status in real time. Similarly, travel mode classifier 140 is designed to identify the travel mode in real time. Activity type classifier 142 is designed to detect an activity type right after completion of a dwelling activity episode. Instant activity-trip classifications 156 are stored in main database 110 and displayed on user interface 108.

User activity-trip tag data 158 are obtained via user interface 108. User inputs on activity type and travel mode (corrections, augmentations, etc.) are stored in main database 110 and are used to optimize sensor data processor 106. Incorporating user tags on activity locations and trips make the algorithms sensitive to individual users and improve the classification results.

Figure 2:
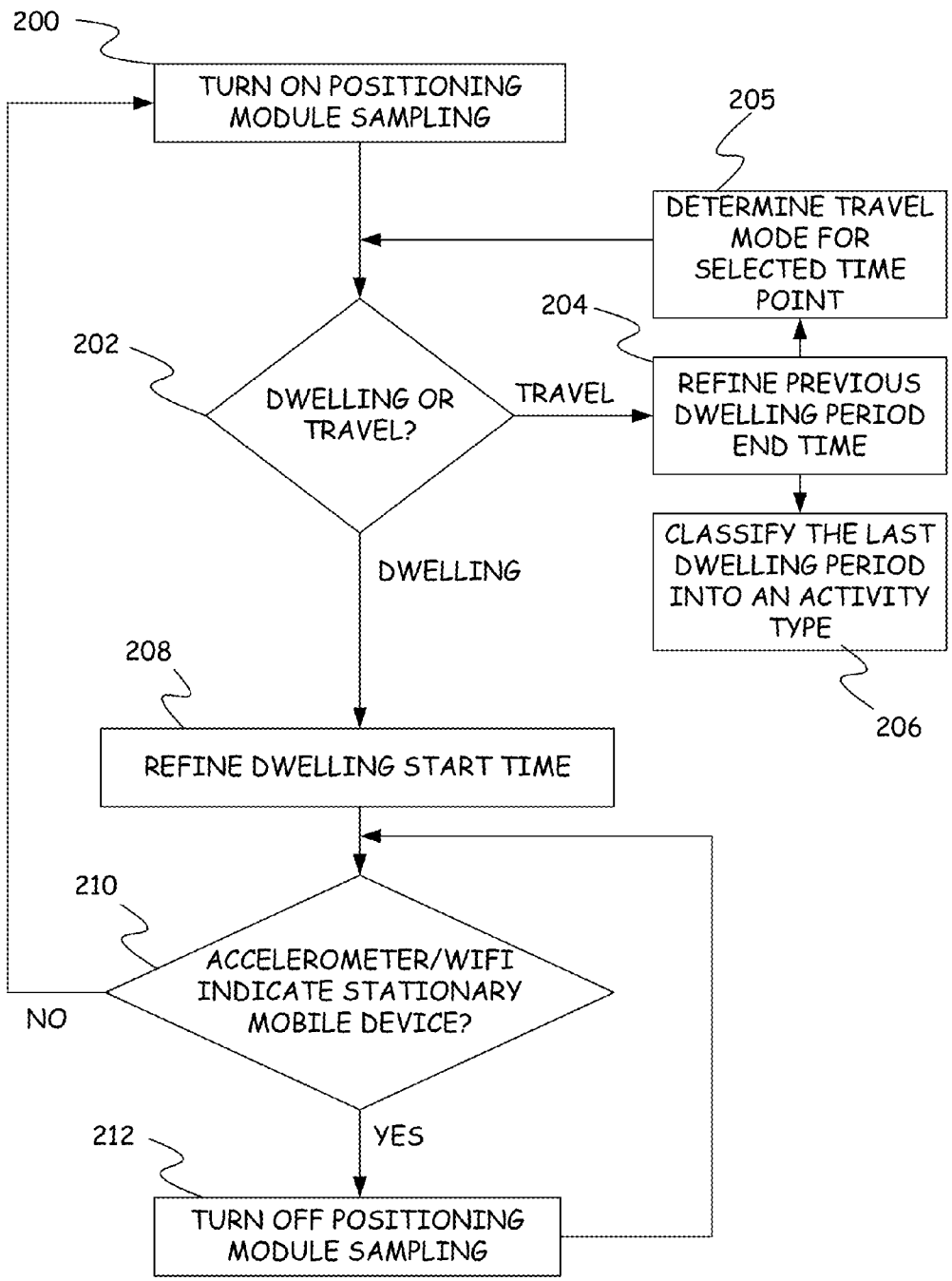
FIG. 2 is a flow diagram for determining travel periods, dwelling periods, travel modes and activities.

FIG. 2 provides a flow diagram of a method of identifying and classifying travel periods and dwelling periods in accordance with one embodiment. In step 200 of FIG. 2, a position controller 180 turns on or activates positioning module 134 so that positioning module 134 begins to collect positioning data, such as GPS data and to use that collected data to identify a position for the mobile device, a velocity for the mobile device, a bearing degree/direction for the mobile device, and an acceleration for the mobile device.

At step 202, activity/trip separator 138 determines if the mobile device is travelling or dwelling. Let t be a point defined by a unique (time, location) pair. Activity/trip separator 128 determines whether or not t is a dwelling point at step 202 by assessing the diameter of the set of locations recorded within predetermined time intervals of t. In accordance with one embodiment, activity/trip separator 138 assess the diameter of the set of locations recorded within 2.5 minutes of t (i.e., both 2.5 minutes before t and 2.5 minutes after t). t is determined to be a dwelling point if the distance between all pairs of points within 2.5 minutes before and after t are shorter than a set distance such as 200 meters. In other words, t is labeled as a dwelling point if the locations recorded within 2.5 minutes of t fall within a circle with diameter less than the set distance. Though position samples may be recorded as often as every second, activity/trip separator 138 updates dwelling status every 30 seconds using a coarsened (once per 30 seconds) subset of positioning data in one embodiment. The use of such coarser positioning data provides a very significant reduction of computing time (i.e., allowing dwelling points to be identified in real time) while maintaining high accuracy.

The dwelling episode detection algorithm used in in one embodiment is as follows:

i. Accumulate positioning data for 5 minutes and sample the data at a 30-second interval to create a queue of 11 time points (point t and 5 time points before and after);

ii. Measure direct linear (airline) distances between all pairs of the points in the queue;

iii. If all the distances are shorter than the set distance, declare t as belonging to a dwelling (activity) region. Otherwise, declare t as belonging to a trip.

Figure 3:
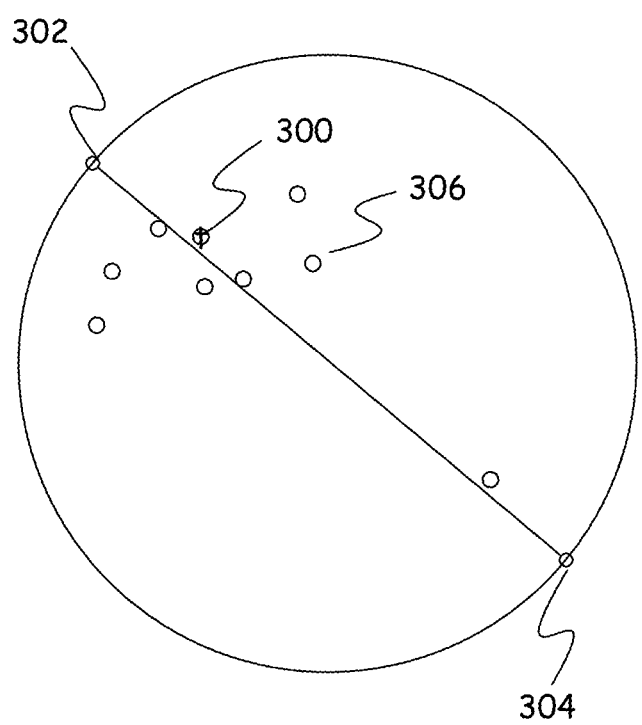
FIG. 3 is a graph of battery usage for a collection of mobile devices.

FIG. 3 provides positions for a set of samples in a queue used to determine if a sample 300 marks the beginning of a dwelling time. The samples, such as samples 302, 304 and 306, are taken both before and after sample 300. The distance between each of the samples is determined and is compared to a set distance such as 200 meters. If all of the distances between the samples are less than the set distance, the mobile device will be considered to be dwelling for sample 300. If one of the distances exceeds the set distance, the mobile device will be considered to be travelling for sample 300.

If activity/trip separator 138 determines that the mobile device is travelling for the sample at step 202, activity/trip separator 138 refines the end time for the previous dwelling period at step 204, if it has not already been refined. Initially, the end time of a dwelling period is the time point at which positioning module 134 is turned on at step 200. In step 204, activity/trip separator 138 refines this time by examining the positioning samples received after positioning module 134 was turned on at step 200. In particular, a set of the position samples within a set time window (e.g., 5-minute window in one embodiment) is collected. Then, the distances between all pairs of samples in the set are calculated. Largest such distance is identified and represents the diameter of the sample set. Then, the last sample is temporarily removed from the set, and the diameter is recalculated. If the diameter of the set reduces significantly (compared to the one before the last sample removal), the last sample is permanently removed from the set, resulting in a smaller sample set. The step of identifying and removing the last sample in the set, and of comparing the diameters of the set before and after last sample removal is repeated until the diameter no longer changes or until the first sample of the set is found. In either case, the last sample in the set is then designated as the more accurate end of the dwelling period.

After the end time of the previous dwelling period is refined at step 204, mobile device 102 starts two processes that operate in parallel. The first process determines a travel mode for a time point at step 205 (for time points classified to be part of the trip by activity/trip separator), and the second process classifies the last dwelling period into an activity type at step 206 (for time points classified to be part of the activity by activity/trip separator).

Figure 4:
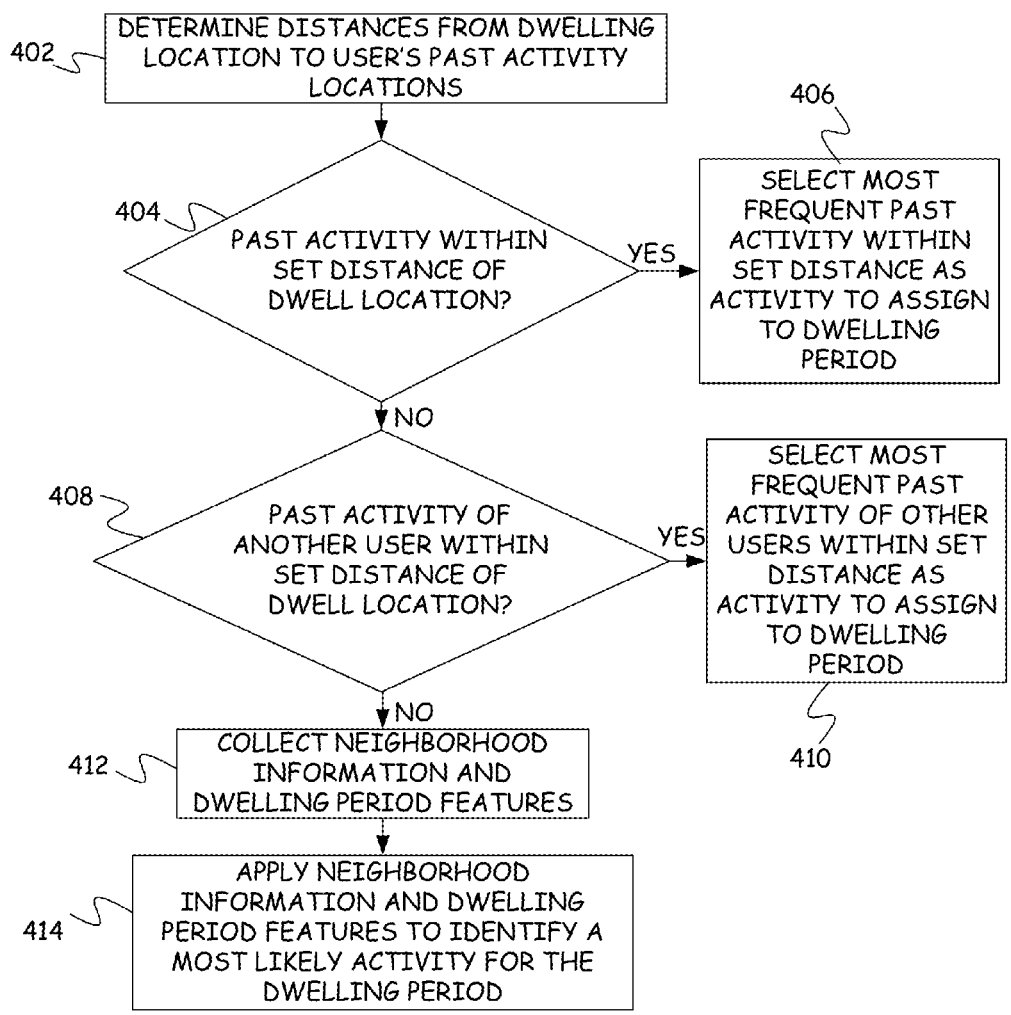
FIG. 4 is a flow diagram for determining an activity during a dwelling period.

FIG. 4 provides a flow diagram of a method for performing step 206 of FIG. 2 to classify a dwelling period into an activity type. In accordance with most embodiments, the method of FIG. 4 classifies the dwelling episode under an activity type while the user is still traveling from the location of the dwelling episode. This allows user interfaces (discussed below) to be provided to the user to confirm or change the activity type of the dwelling episode while they are traveling from the dwelling episode.

Figure 5:
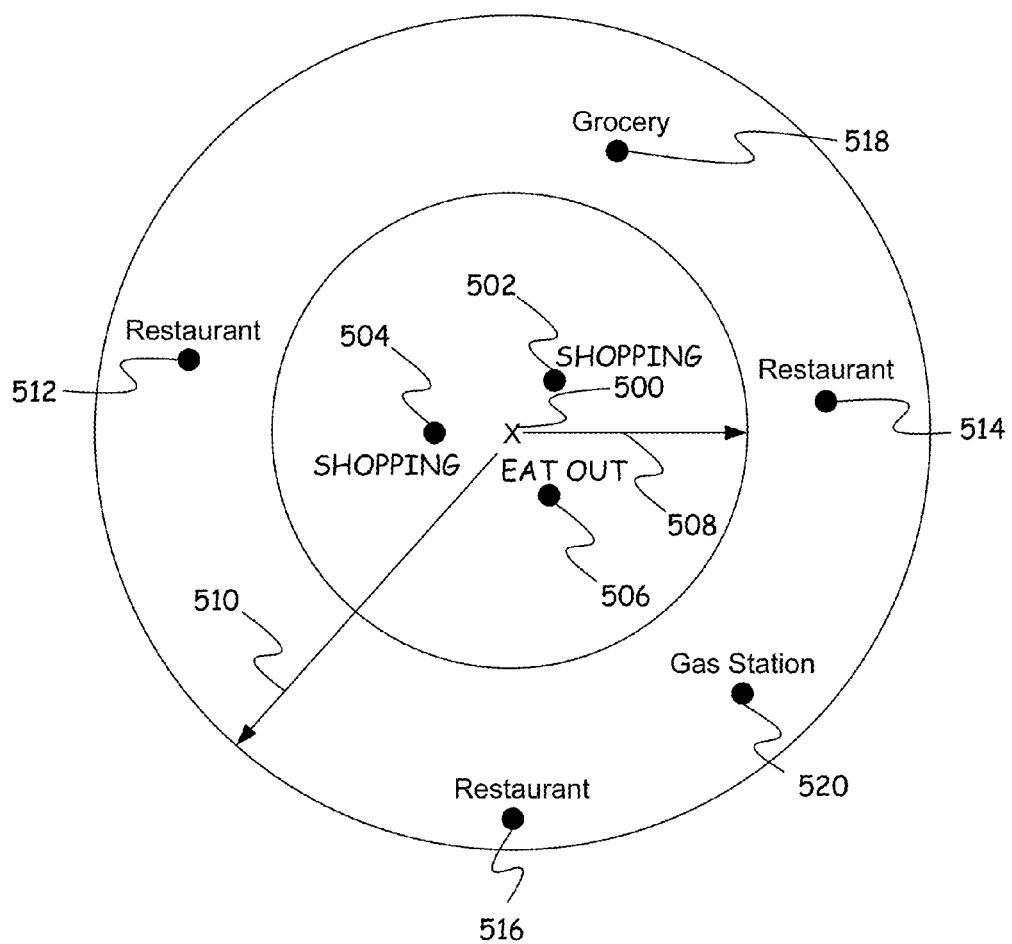
FIG. 5 is a graph showing surrounding activities and location attributes at a dwelling location.

At step 402, activity type classifier 142 determines distances from the dwelling location to the mobile device's past activity locations. In accordance with one embodiment, the dwelling location is the centroid of position samples collected when the user first began to dwell before the positioning sampling was turned off. The mobile device's past activity locations are stored in user activity-trip tag data 158. At step 404, activity type classifier 142 identifies all historic activities that were within a set distance of the dwell location. For example, in FIG. 5, a dwell location 500 is shown as are three past activities 502, 504 and 506 that are within a distance 508 of dwell location 500. Each of activities 502, 504 and 506 represent an activity previously performed by the user holding the mobile device. At step 406, activity type classifier 142 selects the most frequent past activity within set distance 508, which in one embodiment is 50 meters, as the activity to assign to the dwelling period. In the example of FIG. 5, activities 502 and 504 each have an activity type of shopping, while activity 506 has an activity type of eat out. Thus, the most frequent past activity is shopping and as such, activity type classifier 142 would classify the activity at dwell location 500 as shopping in step 406.

If there are no past activities within set distance 508 at step 404, activity type classifier 142 searches for past activities of other users within set distance 508 of dwell location 500. The past activity of other users are stored on server 114, which mobile device 102 can communicate with through network communication interface 126 in accordance with one embodiment. If a past activity of another user is found within set distance 508 at step 408, activity type classifier 142 selects the most frequent past activity of other users within the set distance as the activity to assign to the dwelling period at step 410.

If there is no past activities within the set distance in steps 404 or 408, activity type classifier 142 collects neighborhood information and dwelling period features at step 412. The neighborhood information is retrieved from a server 118 that mobile device 102 can communicate with through network communication interface 126. This neighborhood information, in accordance with one embodiment, includes generic labels applied to locations within a second set distance 510 of dwell location 500, where second set distance 510 in one embodiment is 100 meters. For example, in FIG. 5 the generic label Restaurant has been applied to locations 512, 514, and 516, the generic label Grocery has been applied to location 518 and the generic label Gas Station has been applied to location 520. Activity type classifier 142 applies a weight to each returned label based on the percentage of returned locations that had that label. For example, if 20% of the locations returned by server 118 had a "restaurant" label, then the restaurant label would be given a weight of 0.20.

The dwelling period features, in accordance with one embodiment, include the type of activity that preceded this activity, the day of the week, whether today is an official holiday, whether the trip to the location of the dwelling period was the first trip of the day, the number of trips that were taken before the trip to the dwelling location, the mode of travel used during the trip to the dwelling location, the latitude/longitude of the dwelling location, the arrival time at the dwelling location, the exit time from the dwelling location, the airline distance from the previous dwelling location to this dwelling location, the duration of the activity at the dwelling location and whether the user of the mobile device is a worker or a student.

At step 414, the neighborhood information and the dwelling period features are applied to one or more models to identify a most likely activity for the dwelling period. In accordance with one embodiment, a random forest of decision trees is used in which each decision tree predicts a most likely activity given the neighborhood information and dwelling period information and the activity that is most often identified by the decision trees is selected as the activity for the dwelling period. Although a random forest of decision trees is used in one embodiment, in other embodiments other types of models may be used to identify the most likely activity for the dwelling period.

In FIG. 4, an activity is identified for a dwelling period using a cascade approach in which techniques that use less processor time and thus less battery power are used before techniques that are more processor intensive and that consume more battery power. In particular, the method of FIG. 4 first examines previous activities stored in user activity-trip tag data 158 of main database 110. Examining entries in main database 110 does not require communication with a server and does not require execution of a model. If a previous activity cannot be found at step 404, the process of FIG. 4 contacts server 114 for activities of other users at step 408. Since this requires communicating over a network it typically requires more energy than search main database 110. If a previous activity cannot be found on server 114, the method determines features and applies the features to one or more models, which requires more processor functions and more energy than steps 404 and 408. Thus, the cascade approach reduces battery usage and the demands on the processor for activities that are performed repeatedly by the user or that are performed by other users.

Figure 6:
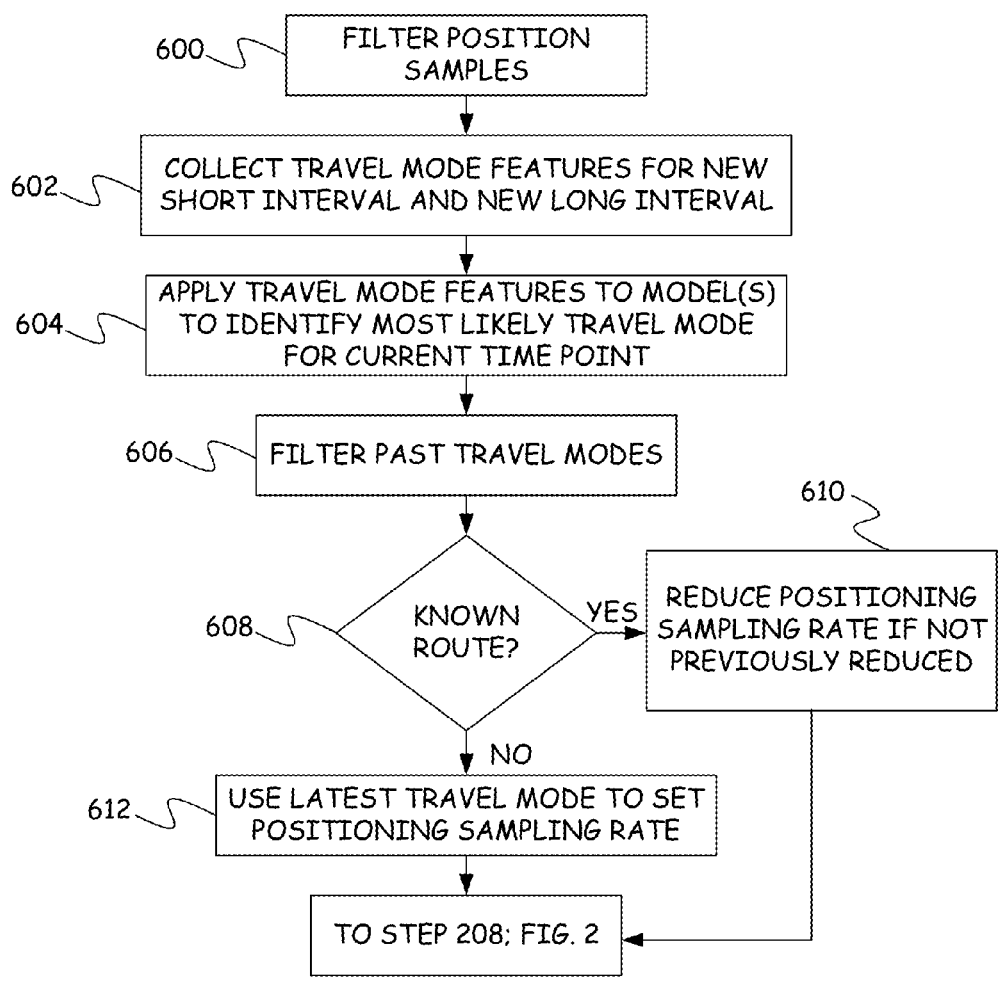
FIG. 6 is a flow diagram of a method of determining a travel mode.
Figure 7B:
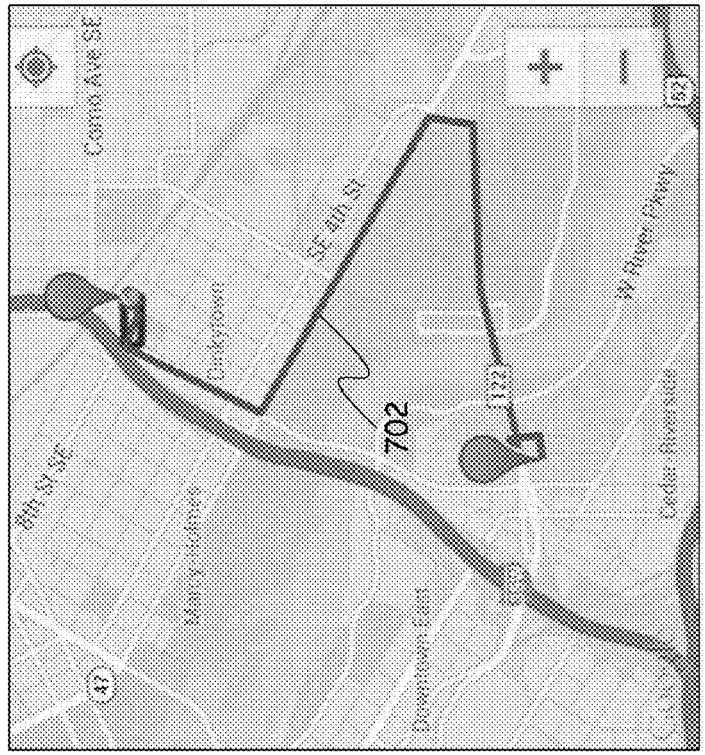
FIG. 7B is a map showing filtered position data.
Figure 7A:
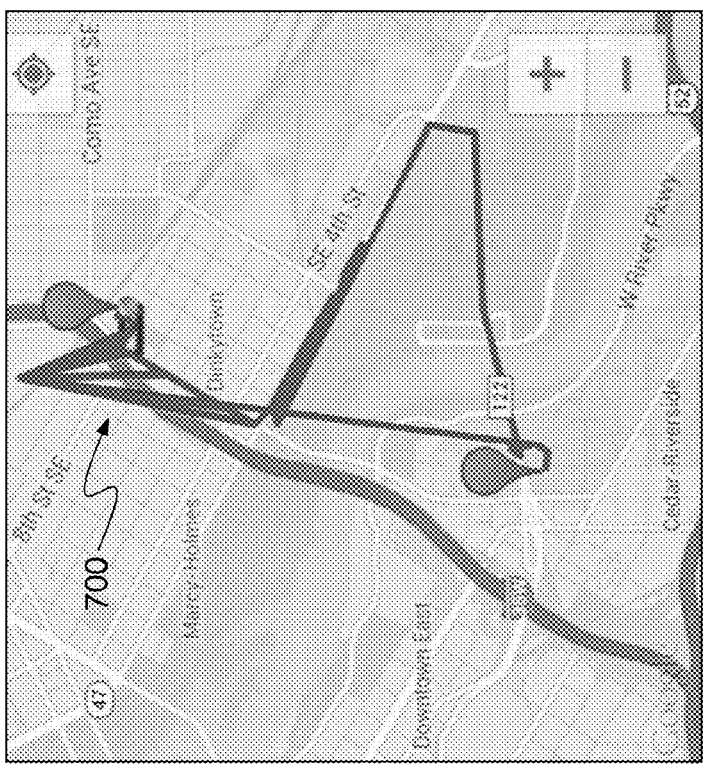
FIG. 7A is a map showing unfiltered position data.

FIG. 6 shows a flow diagram of a method of performing step 205 of FIG. 2 to determine a travel mode for selected time points. In step 600 of FIG. 6, position samples are filtered to remove locations that are likely to be inaccurate. In accordance with one embodiment, locations that are provided by positioning module 134 with an accuracy of greater than 100 meters, in other words, the location is defined as being at a longitude and latitude +/−100 meters or greater; or locations where positioning module 134 indicates a speed of 500 meters per second or above; or locations where positioning module 134 indicates an acceleration of greater than 15 meters per square second, the locations are filtered by data filter 136. FIG. 7A shows an example of location data plotted on a map for locations without filtering and FIG. 7B shows locations plotted with location filtering. In FIG. 7A, the mobile device appears to jump around due to erroneous position samples. For example, there are a collection of paths 700 that extend to and from a same point. In FIG. 7B, the filtered position samples show the mobile device following a realistic path 702.

Figure 8:
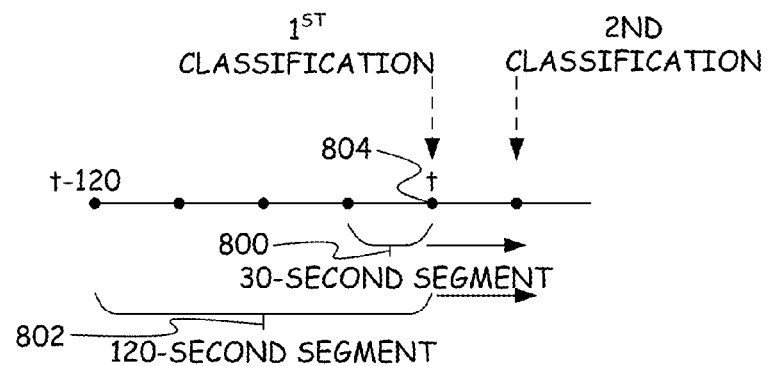
FIG. 8 is a graph showing segmentation and mode prediction.

At step 602, travel mode features are collected for a new short interval and a new long interval by travel mode classifier 140. Having different types of intervals provides a more comprehensive view of the trip, which is advantageous for accurately predicting travel mode. In one embodiment, the length of a short interval is 30 seconds and the length of the long interval is 120 seconds. FIG. 8 shows an example of a short interval 800 and a long interval 802 for a selected time point 804 that is being classified into a travel mode. In accordance with one embodiment, accelerometer values from accelerometer 132 and velocity and acceleration values from positioning module 134 are collected every second of the short interval 800 and every second of the long interval 802.

A large number of features are derived from the velocity (speed) and acceleration data and are used to select the travel mode features. Table 1 summarizes these features in accordance with one embodiment. Features may belong to the time domain or the frequency domain, and be set-based or sequence-based as detailed below.

TABLE 1

Features calculated by SmarTrAC to predict travel mode

| | Speed data | | Acceleration data | |
| --- | --- | --- | --- | --- |
| | Set-based | Sequence-based | Set-based | Sequence-based |
| Time domain | | | | |
| Mean | x | x | x | x |
| Median | x | x | x | x |
| Quantile | x | x | x | x |
| IQR | x | x | x | x |
| Variance | x | x | x | x |
| Coeff of Variation | x | x | x | x |
| Minimum | x | x | x | x |
| Maximum | x | x | x | x |
| Kurtosis | x | x | x | x |
| Skewness | x | x | x | x |
| Autocorrelation | x | x | x | x |
| Generalized Entropy | x | x | x | x |
| Bearing changes | | x* | | |
| Frequency domain | | | | |
| FFT coeffs | | | | x |
| Sum of FFT coeffs | | | | x |
| Zero-crossing rate | | | | x |

*= Uses sequential heading rather than speed data.

Time domain features are summary statistics which describe the distribution of the (speed or acceleration) measurements taken in a given time window. The following time domain features are provided for both speed and acceleration data unless otherwise noted:

Mean: Arithmetic average of observations over a defined segment.

Median: The sample median.

Quantile: The sample 20th and 80th quantile.

Inter Quartile Range(IQR): The difference between the 75th (Q3) and 25th quantile (Q1).

Variance: The sample variance.

Coefficient of Variation: The sample coefficient of variation.

Minimum: Sample minimum.

Maximum: Sample maximum.

Kurtosis: Based on higher order moments, the kurtosis indicates the "sharpness" of peaks in the distribution of the observations.

Skewness: Based on higher order moments, this feature describes the deviation from the symmetry of a probability distribution of a random variable around its defined mean. Skewness can be positive or negative depending on the nature of asymmetry.

Autocorrelation: Measure of correlation between successive observations.

Generalized Entropy: Quantifies the degree of disorder or variability in the observations.

Bearing changes: Using data from the smartphone magnetometer, counts the number of second-to-second changes in bearing (e.g., N→NE) which exceed 15°.

Frequency domain features are calculated by viewing the set of measurements as a time series which can be described as a superposition of wave functions. The features are mostly based on the Fast Fourier transform (FFT). The following frequency-domain features are provided on acceleration data only:

First 6 real and imaginary components of the FFT,

Sum of the FFT coefficients: These sums are calculated separately for real and imaginary components, Zero crossing rate (ZCR): Measures how frequently the time series changes signs (i.e., crosses zero).

Set-based features are calculated from the actual measurements in a given time window. Sequence-based features are calculated from the sequential differences of measurements in a given time window. Both set-based and sequence-based features only apply to data as viewed in the time domain.

In accordance with one embodiment, model training involves feature selection in which features that provide better models are selected as part of the training process. In accordance with one embodiment, the feature selection process selected the following features: Mean, Median, Quantiles, IQR, Variance, Minimum, Maximum, Kurtosis, Skewness and Autocorrelation using set-based and sequence-based speed and acceleration data.

Figure 9:
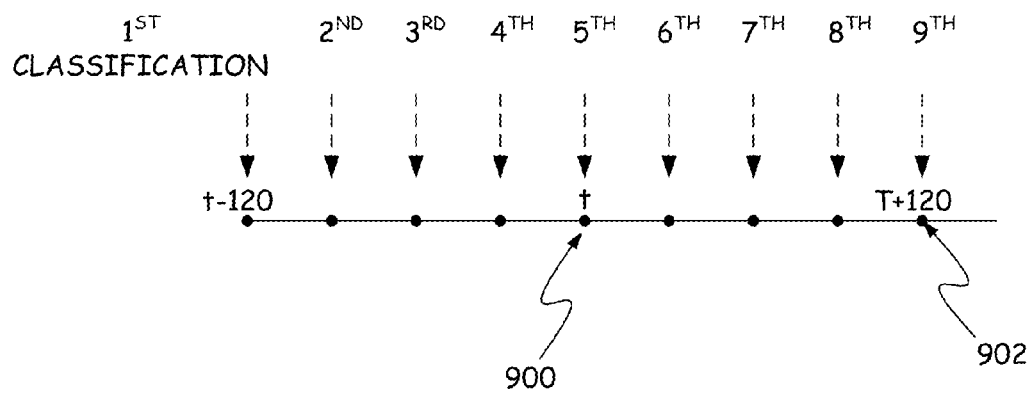
FIG. 9 is a graph showing smoothing of pointwise classifications.

At step 604, the travel mode features for the short interval 800 and the long interval 802 are applied to one or more models by travel mode classifier 140 to identify a most likely travel mode for the current time point. In accordance with one embodiment, the models are a random forest of decision trees, however in other embodiments, other types of models are used such as classification regression trees, conditional interference trees, neural networks, support vector machines, Bayesian networks, gradient boosting techniques, and ensemble methods. At step 606, travel modes identified for past time points are filtered (or smoothed) by travel mode classifier 140 to remove sudden and brief changes in the mode of transportation since such sudden and brief changes are highly unlikely. This improves the performance of the travel mode predictions. FIG. 9 provides an example of such filtering/smoothing where a time point 900 that is 120 seconds before a present time point 902 is compared to the travel mode classifications of the four proceeding time points and the four following time points. If the classification for the selected time point is not the most commonly predicted travel mode of the eight other neighboring time points, the travel mode classification at the time point 900 is changed to the most commonly classified travel mode. Although an embodiment using a simple majority vote as the smoothing function has been described, in other embodiments, other smoothing functions are used.

Once the past travel modes have been filtered/smoothed, the process continues at step 608 where a trip prediction match 182 examines attributes of the current trip to determine if the attributes match any previous trips stored in activity-trip classification 156. Attributes used to find a matching previous trip include the time of day that the trip started, the day of week, the travel mode, the activity performed before the trip began as determined in FIG. 4, and the route in accordance with some embodiments. If trip prediction match 182 determines that the current trip matches a previous trip stored in activity-trip classification 156, trip prediction match 182 instructs position controller 180 to reduce the sampling rate of positioning module 134 at step 610. For example, instead of sampling every second, positioning module 134 can be activated every 30 seconds or every 60 seconds to acquire positioning information. This reduction in the sampling rate greatly reduces the battery usage of the mobile device and thus improves the performance of the mobile device. The trip matching of step 608 is performed while the trip is in progress.

If trip prediction match 182 does not determine that the current route is a known route, travel mode classifier 140 uses the latest travel mode to set the sampling rate of positioning module 134 through position controller 180 at step 612. For example, when a person is walking, positioning module 134 does not need to sample position, velocity and acceleration information as frequently as when the user is riding in a car because the user's position and velocity do not change as quickly when they are walking as when they are in a car. By adjusting the sampling rate based on the latest travel mode, these embodiments improve the performance mobile device 102 by extending the battery life of mobile device 102.

After step 610 or 612, the predicted travel mode is stored in activity-trip classification 156 and activity/trip separator 138 returns to step 202 of FIG. 2 to determine if the mobile device is travelling or dwelling for a new time point. In one embodiment, the new time point is 30 seconds after the previous time point.

If a new dwelling period has not begun at step 202, the process returns to step 205 to determine the travel mode for the new time point. If a new dwelling period is detected at step 202, activity/trip separator 138 improves the identification of the true starting time point of the dwelling period at step 208. In particular, the following steps are performed during step 208:

i. Given t as the starting point of a dwelling episode identified in step 202 (i.e., the time point 30 seconds before t was identified as trip/travel mode and the time point t was identified as the start of a dwelling episode), get the five 30-second interval points after t and the five 30-second interval points before t to form an initial queue/set of 11 time points (including time point t), as was done in step 202;

ii. Calculate the maximum distance between any pairs of the points in the queue (i.e., calculate the diameter of the set);

iii. Take out the first point in the queue and recalculate the maximum distance between all remaining pairs of points in the queue (i.e., calculate the diameter of the set with the first point removed);

iv. Compare the new maximum distance with the previous maximum distance: If the new maximum distance is shorter than the previous maximum distance (indicating that the removed data point was still significantly away from the initial dwelling point t) and the difference between the two distances is larger than 5 meters, identify the point taken out of the queue in step iii as in travel mode; otherwise, identify this point as the revised starting point of the dwelling episode (i.e., more precise starting point than the approximate starting point t);

v. Repeat steps iii-iv until (a) either a more precise starting point is found in step iv, or (b) time t is the next point to be removed from the queue (indicating that the approximate solution t itself is the best candidate for the more precise starting point).

After the dwelling start time has been refined at step 208, the process of FIG. 2 continues at step 210 where it uses data from accelerometer 132 and Wi-Fi sensor data 133 to determine if the mobile device is stationary. When the magnitude of average acceleration is less than some threshold, such as 0.1 m/s$^2$ in the past 5 minutes, Wi-Fi scan is performed to capture all currently detectable Wi-Fi Access Points (AP) and store the scanned results as a reference Wi-Fi list in Wi-Fi sensor data 133. When motion is detected by accelerometers with average acceleration greater than a second threshold, such as 0.2 m/s$^2$, another Wi-Fi scan is performed and is stored in Wi-Fi sensor data 133 as a current Wi-Fi list for comparison. Each record from a Wi-Fi scan list includes Service Set Identifier (SSID), Basic Service Set Identifier (BSSID), Received Signal Strength Indication (RSSI), and frequency. SSID is also known as the name of the router/network. BSSID is the MAC address of an access point (AP). The RSSI is the received signal strength from the corresponding AP. RSSI is expressed in dBm which is defined as the power ratio in decibels (dB) of the measured power referenced to one milliwatt (mW) as displayed in Equation (1).

$$dBm = 10\log_{10}\frac{Power}{1\ mW} \quad (1)$$

The RSSI signal strength in dBm can be converted into a discrete N-level signal indication (where N=5 is a commonly used value), often displayed using bars on mobile device screens. The signal strength can be computed from the RSSI signal strength.

The current and reference Wi-Fi lists are then compared to determine if the mobile device has changed locations. In accordance with one embodiment, a Jaccard index and a normalized weighted signal level change index are used to determine if the mobile device has moved. If either index indicates that the mobile device is moving, then the mobile device is considered to no longer be stationary at step 210.

Under the Jaccard index, the similarity of two sets $S_1$ and $S_2$ is defined as:

$$J(S_1, S_2) = \frac{|S_1 \cap S_2|}{|S_1 \cup S_2|} \in [0, 1] \quad (3)$$

In step 210, $S_1$ and $S_2$ are the reference BSSID list and the current BSSID list, respectively. More specifically, given two Wi-Fi fingerprints $F_1$ and $F_2$ from two different locations, $S_1$ and $S_2$ are defined to include BSSIDs of only those networks that have a signal level (ranging from 0 to 4) equal or greater than 3 for Jaccard index calculation. Formally, $$S_i = \{BSSID | (BSSID, RSSI) \in F_i, SignalLevel(RSSI, 5) \geq 3\}, \text{ for } i = 1, 2.$$

That is, this approach uses the changes in the fingerprint of the strong-signal networks (with signal strength of 3 or higher) for location change determination. By definition, the value of $J(S_1, S_2)$ is always between 0 and 1. In step 210, the location of the mobile device is considered to be changed when the Jaccard index drops below some threshold $J_{threshold}$, i.e. $J(S_1, S_2) < J_{threshold}$, which essentially indicates that the overlap between two sets of Wi-Fi networks from scans $F_1$ and $F_2$ is minimal.

The normalized weighted signal level change (NWSLC) describes changes of a network signature by weighting the signal level differences between a reference (from $F_1$ scan) and current (from $F_2$ scan) signal level with its reference signal strength and then taking the normalized average. It is defined as follows.

$$A = \frac{1}{Nn}\sum_{i=1}^{n} SignalLevel_{ref_i} \times |SignalLevel_{cur_i} - SignalLevel_{ref_i}| \quad (4)$$

Where,
A is the NWSLC index,
n is the number of intersection samples (i.e., n=|$F_1 \cap F_2$|),
N is the total number of signal levels (i.e., N=5 in our case),
$SignalLevel_{ref_i}$ is the signal level of reference AP i (from scan $F_1$),
$SignalLevel_{cur_i}$ is the signal level of current AP i (from scan $F_2$).

The location of the mobile device is considered to have changed in step 210 when the NWSLC index is larger than a threshold $A_{threshold}$ i.e., $A \geq A_{threshold}$, which takes into account not only the change in visible Wi-Fi networks but also the relative change in their signal strength.

If both indexes indicate that the mobile device is stationary at step 210, activity/trip separator 138 instructs position controller 180 to turn off positioning module 134 so that it is no longer collecting or sampling the position, speed and acceleration information for mobile device 102 at step 212.

Figure 10:
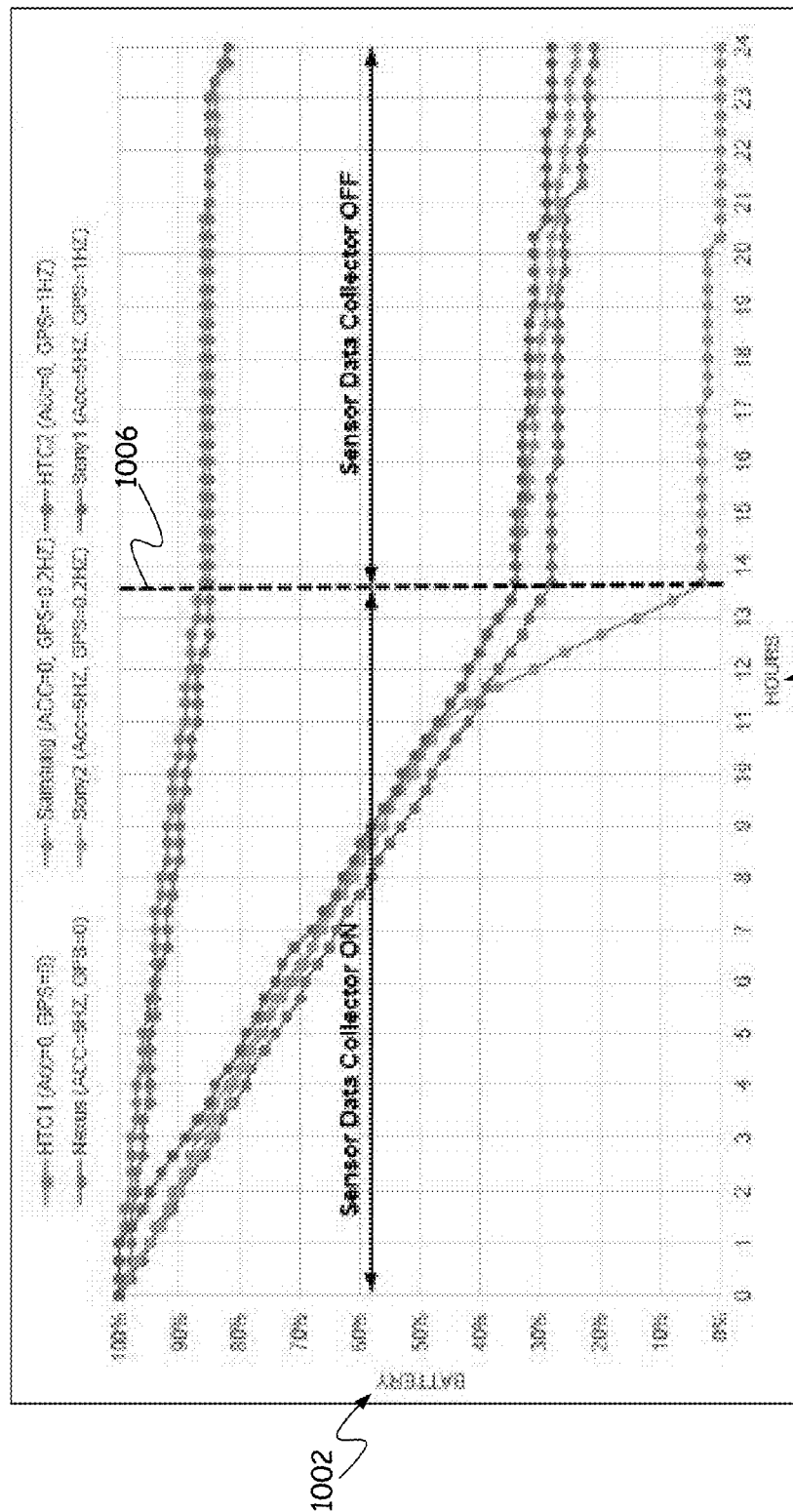
FIG. 10 is a graph showing sampled position information used to determine if a new dwelling episode has begun.

Controlling whether positioning module 134 is active improves the performance of mobile device 102 by reducing the battery consumption of mobile device 102. This can be seen in the graphs of FIG. 10, which shows remaining battery energy on vertical axis 1002 and hours of usage on horizontal axis 1004. In FIG. 10, a separate graph is provided for each of a plurality of mobile devices. Data points to the left of a line 1006 are associated with battery consumption when positioning module 134 is active or on and data points to the right of line 1006 represent battery usage when positioning module 134 is inactive or turned off. As can be seen in FIG. 10, for nearly every device, the rate of battery consumption as indicated by the slope of the lines is greater when positioning module 134 is turned on than when positioning module 134 is turned off. Thus, by controlling when positioning module 134 is active, the embodiments described herein improve the performance of the mobile device by extending the length of time that the mobile device can be used without recharging.

After positioning module 134 is turned off, the process returns to step 210 and uses accelerometer 132 and Wi-Fi data 133 to determine if the mobile device is still stationary. When the mobile device begins to move again at step 210, the process returns to step 200 where positioning module 134 is reactivated/turned on. Steps 202, 204, 205, 206, and 208 are then repeated.

In accordance with the several embodiments, user interfaces are provided that indicate the trip and activity classifications determined above in real time or near real time and that allow the user to change the classifications and to annotate trip segments and dwelling periods with additional information.

Figure 11:
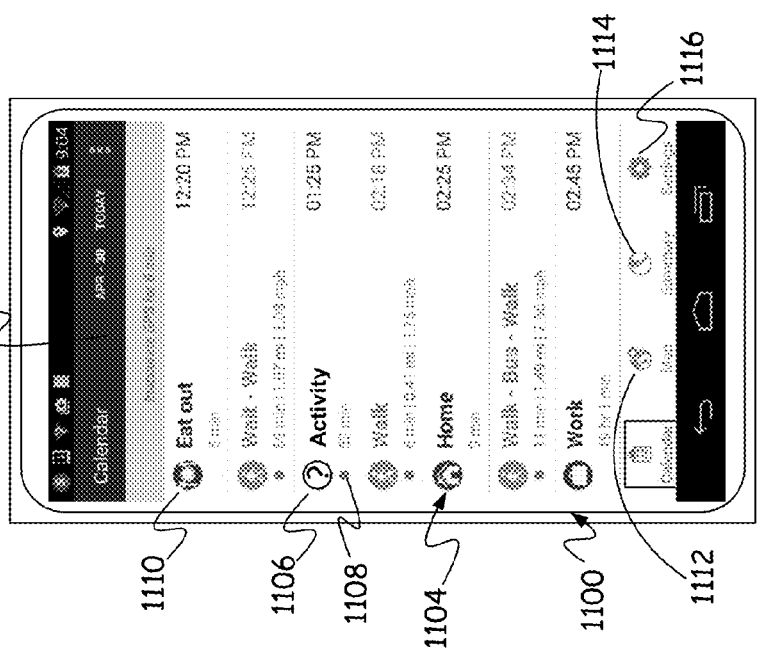
FIG. 11 is a user interface showing a calendar view for a single day.

FIG. 11 provides an example user interface providing a daily view showing a list of trip classifications and activity classifications for a selected day. User interface 1100 of FIG. 11 includes a swipeable date control 1102 that can be swiped to the left or the right to change the date. In response to changes in the date in date control 1102, the list of trips and activities associated with the new date will replace the list presented for the previous date. The list of trips and activities 1104, in accordance with one embodiment, organizes the trips and activities in a temporal manner with trips and activities alternating in the list. Thus, the user is shown to be performing an activity then traveling to a next activity and then performing the next activity.

In accordance with one embodiment, the activity classifications provided by activity type classifier 142 are displayed in list 1104. In other embodiments, the activity classifications are only displayed in list 1104 after they have been confirmed by the user as discussed further below. Until they are confirmed, they appear as a generic activity with a question mark symbol such as entry 1106. In addition, entries that have not been confirmed by the user yet are signified by a dot, such as dot 1108 of entry 1106. This is compared with entry 1110 in which the classification provided by activity type classifier 142 has been confirmed as "Eat out".

Figure 12:
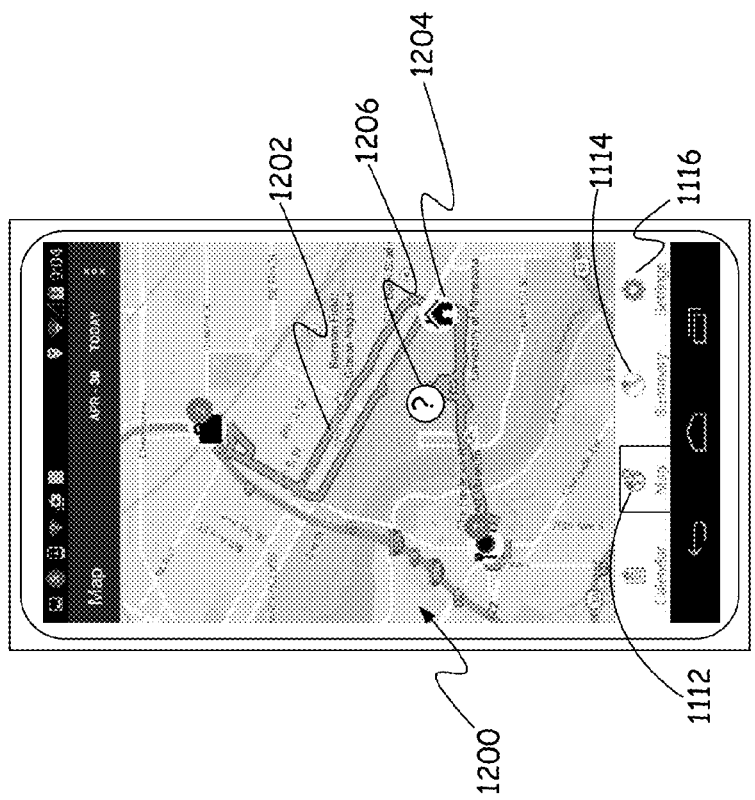
FIG. 12 is a user interface showing a map view for a single day.

A user can transition from the calendar list view of FIG. 11 to a map view 1200 of FIG. 12 using a map menu control 1112.

In user interface 1200 of FIG. 12, the information that was present in user interface 1100 is depicted on a map. In particular, each trip is depicted as a path on the map such as path 1202 and each activity is displayed using an activity icon such as home icon 1204 or generic activity icon 1206.

Figures 13, 14:
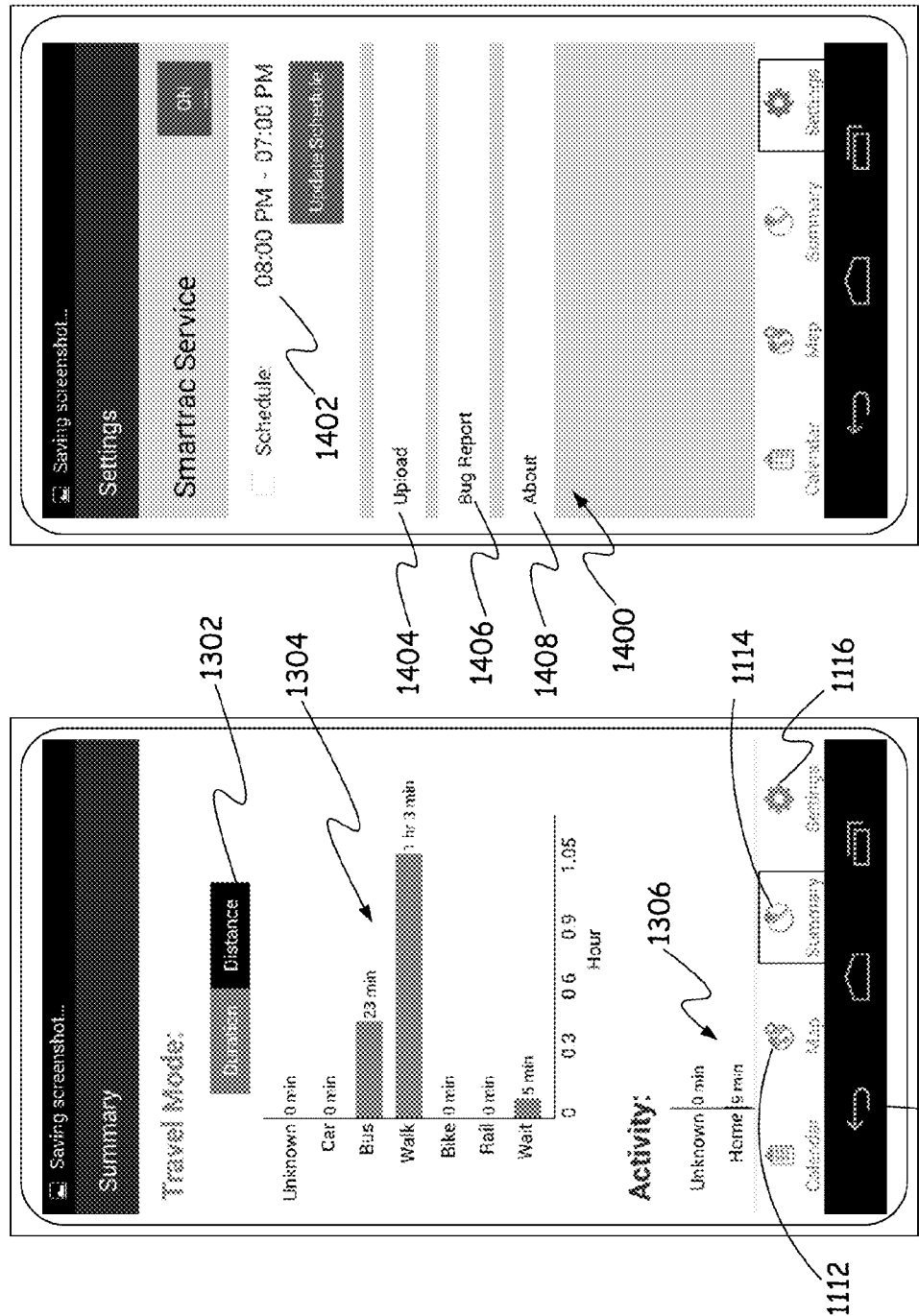
FIG. 13 is a user interface showing a summary for a single day.
FIG. 14 is a user interface showing a settings page.

A user may access a summary user interface 1300 of FIG. 13 that provides a summary of their trips and activities using summary control 1114 of FIGS. 11-14. As shown in user interface 1300, the summary includes a duration/distance control 1302 that allows the user to select between viewing a summary of the length of time spent in various travel modes or the distance covered by various travel modes in a travel mode graph 1304. The length of time spent on each activity is shown in a graph 1306, which is partially shown in FIG. 13, but extends further below what is shown in FIG. 13. The remainder of graph 1306 can be displayed by swiping upward on user interface 1300.

The user may view a settings user interface 1400 of FIG. 14 using a settings control 1116 of FIGS. 11-14. In settings user interface 1400, an update schedule 1402 is provided along with an upload control 1404, a bug report control 1406 and an about control 1408. Upload control 1404, when selected, triggers one or more of raw motion and location data 154, activity-trip classification 156 and user activity-trip tag data 158 to be uploaded to server 122 for use in training one or more of the activities/trip separator 138, travel mode classifier 140 and activity type classifier 142.

Figure 16:
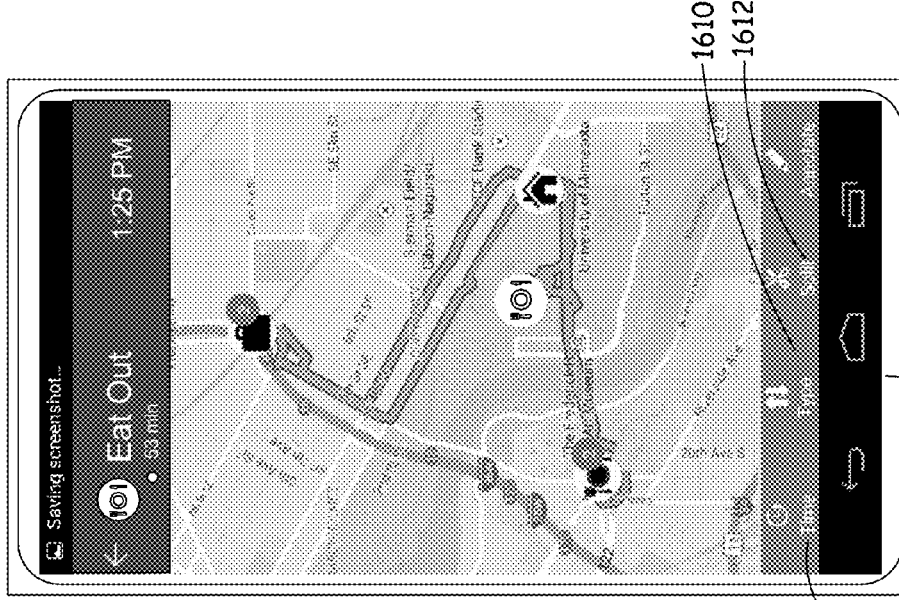
FIG. 16 is a user interface showing a details page for a selected activity period.
Figure 15:
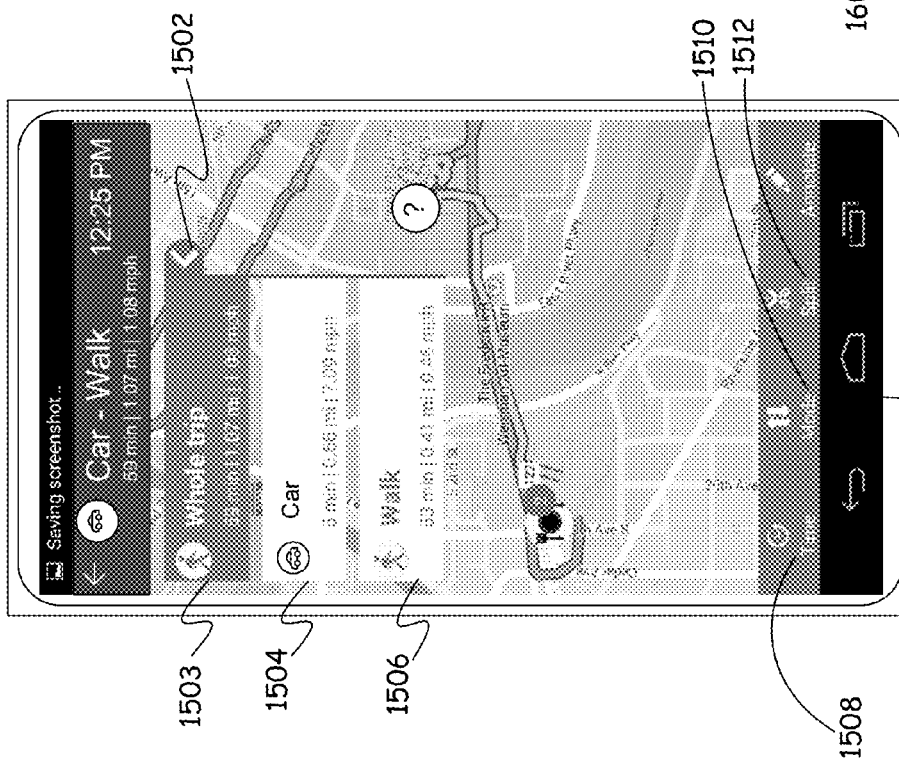
FIG. 15 is a user interface showing a details page for a selected travel period.

Trip segments and activities may be selected from calendar view 1100 or from map view 1112. When a trip is selected, a trip details user interface, such as user interface 1500 of FIG. 15 is displayed. When an activity is selected, an activity details page, such as activity user interface 1600 of FIG. 16, is displayed. In activity user interface 1600, a generic activity shown in calendar view 1100 or map view 1112 has been replaced with a most likely activity identified by activity type classifier 142. If a travel segment is formed of multiple travel modes, the user can select one of the travel modes using a control 1502 that when swiped to the right, as shown in FIG. 15, will display the travel modes that make up the trip segment. For example, in user interface 1500, trip segment 1503 is shown to be constructed of car segment 1504 and walk segment 1506. By selecting one of the travel mode segments of the entire trip, the user is able to modify attributes of that portion of the trip segment.

User interfaces 1500 and 1600 include a time control, such as time controls 1508 and 1608. Selecting the time controls causes a time modification user interface such as user interface 1700 of FIG. 17 for a trip segment and user interface 1800 for an activity to be displayed. User interface 1700 includes a start time control 1702 and an end time control 1704 that may be adjusted by the user to change the start or end time of the travel segment. This start and end time can be for the entire travel segment if the entire travel segment was selected in user interface 1500 or for only a portion of the travel segment if that portion was selected in user interface 1500. Similarly, user interface 1800 includes a start time control 1802 and an end time control 1804 that may be adjusted by the user to change the start and/or end time of the activity. When the start and end times are adjusted as desired by the user, an OK button 1706/1806 can be selected to submit the changes to user-input capturer 152, which alters the data stored in activity-trip classification 156 for the tip segment or activity to reflect the new start and end times. Note that changing a start time of a trip or an activity causes the end time of the preceding activity or trip to also be changed. Similarly, changing the end time of a trip or activity causes the start time of the next activity or trip to be changed.

When the user selects a mode control 1510 of user interface 1500, a menu 1900 of FIG. 19 is displayed that lists possible travel modes. By selecting one of the listed travel modes, the user is able to change the travel mode assigned to the trip segment. For example, by selecting bus 1902 from menu 1900, the user is able to change the travel mode to bus for the trip segment. When the user does not select mode control 1510 or when the user selects mode control 1510 but does not select a different travel mode than the one predicted by travel mode classifier 140 before returning to the calendar view or the map view, the travel mode predicted by travel mode classifier 140 is inherently confirmed. Similarly, when the user selects activity type control 1610 of FIG. 16, a list of activity types 2000 is displayed in a user interface 2002 shown in FIG. 20. List 2000 is a list of available activity types and by selecting one of the activity types, the user is able to reclassify the dwelling time of user interface 1600 to the selected activity type. If the user does not select activity type control 1610 or when the user selects activity type control 1610 but does not change the activity type before returning to the calendar view or the map view, the activity type selected by activity type classifier 142 is inherently confirmed.

Upon selection of the new travel mode or new activity type, user-input capturer 152 updates the data stored in activity-trip classification 156 for the trip segment or dwell period to reflect the new travel mode or activity type.

Figure 21:
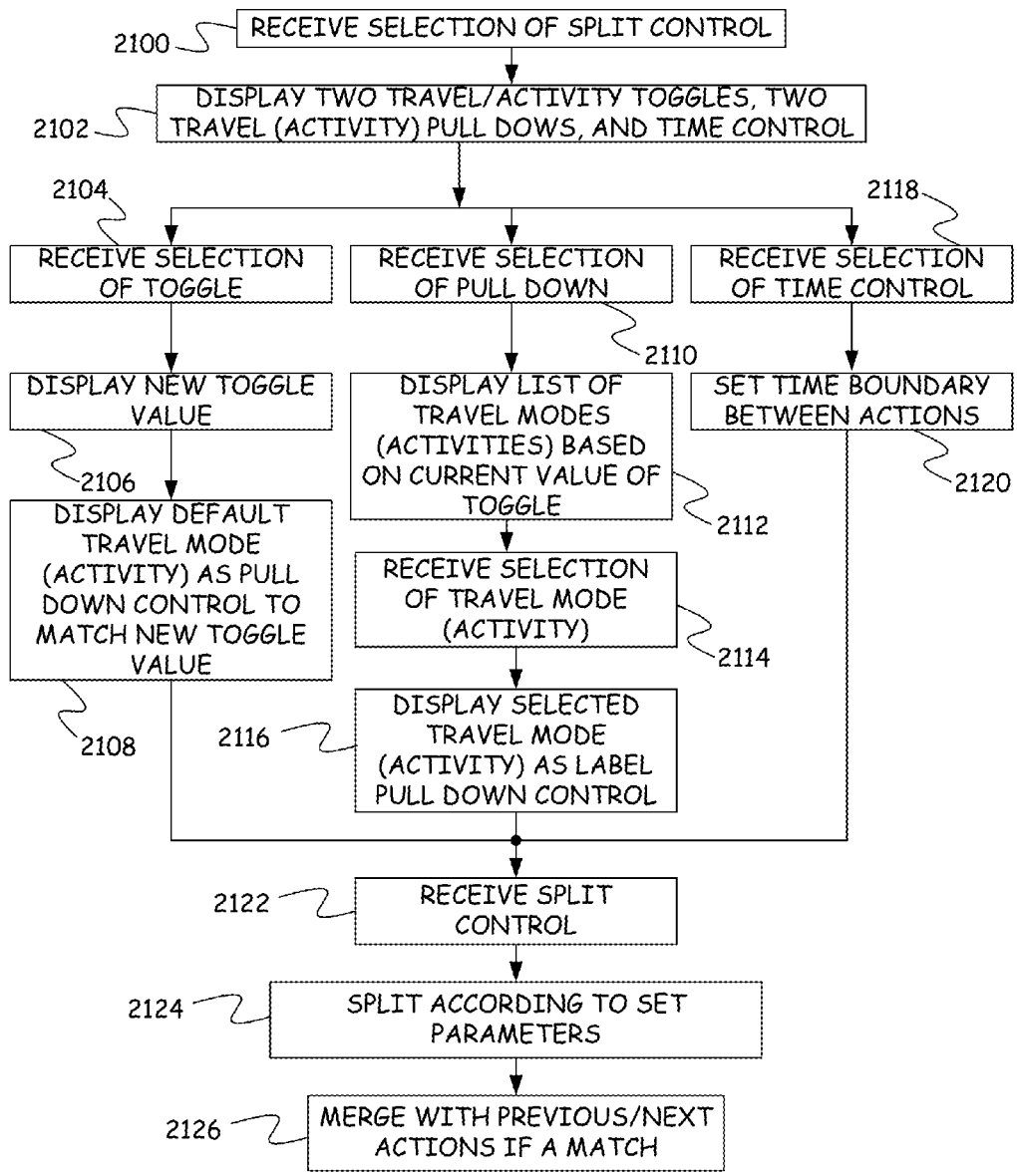
FIG. 21 is a flow diagram of a method of splitting a travel period or a dwelling period into smaller periods.

Trip segment details user interfaces 1500 and the activity details user interface 1600 include split controls, such as split controls 1512 and 1612, respectively. Trip segments and activities can be generically referred to as actions. When the user selects split control 1512 or split control 1612, they are requesting to split an action into two temporally shorter actions. In response to the selection of split control 1512 or split control 1612, user-input capturer 152 provides an action split user interface such as trip segment split user interface 2200 of FIG. 22 or activity split user interface 2300 of FIG. 23. FIG. 21 provides a flow diagram of a method of splitting an action using an action split user interface such as user interfaces 2200 and 2300.

In step 2100, user-input capturer 152 receives the selection of the split control. In step 2102, the action split user interface 2200/2300 is displayed which includes two travel/activity toggles, such as travel activity toggles 2202 and 2204 of user interface 2200 and travel/activity toggles 2302 and 2304 of user interface 2300. The displayed user interface also includes two travel (activity) pull downs, such as travel pull downs 2206 and 2208 of user interface 2200 and activity pull downs 2306 and 2308 of user interface 2300. The displayed user interface also includes a time control, such as time control 2210 of user interface 2200 and time control 2310 of user interface 2300.

When user-input capturer 152 receives selection of one of the travel/activity toggles at step 2104, it toggles the value from either activity to trip or from trip to activity and displays the new toggle value at step 2106. In addition, at step 2108, it displays a default travel mode (default activity) as the label for the pull down control below the changed toggle value at step 2108. For example, if the activity/trip toggle was changed to trip, the default travel mode for trips would be displayed and if the toggle value was changed from trip to activity, the default activity would be displayed. FIG. 24 shows a user interface 2400 that is formed when a user selects toggle 2304 of user interface 2300 causing the toggle to change its value to value 2402 and causing the label on pull down 2308 to change to label 2404, which is the default travel label.

At step 2110, user-input capturer 152 receives a selection of one of the pull down controls, such as pull down controls 2206, 2208, 2306 or 2308. In response to receiving the selection of the pull down, user-input capturer 152 displays a list of travel modes or activities based on the current value of the toggle above the pull down control. If the toggle control is set to activity, a list of activities will be displayed and if the toggle control is set to trip, a list of travel modes will be displayed at step 2112. User interface 2500 shows a list of activities 2502 that is created at step 2112 when pull down control 2308 is selected. At step 2114, user-input capturer 152 receives a selection of one of the listed travel modes or activities and at step 2116, user-input capturer 152 displays the selected travel mode or activity as the label for the pull down control.

At step 2118, user-input capturer 152 receives a selection of time control 2210/2310. In user interfaces 2200 and 2300, time controls 2210/2310 allow the user to set a time boundary between the two actions that the selected action is being divided into. In particular, time controls 2210 and 2310 are slidable controls such that sliding or moving the controls to the left moves the time boundary between the two actions to an earlier time and moving the controls to the right moves the time boundary to a later time. FIG. 26 shows user interface 2600, which is formed after the user has selected time control 2310 and has shifted the time boundary between action 2602 and action 2604 to an earlier time. In response to the movement of time control 2210/2310, user input capturer 152 sets the time boundary between the two shorter actions at step 2120.

At step 2122, user-input capturer 152 receives a selection of a split control, such as split control 2212 and split control 2312. At step 2124, user-input capturer 152 splits the selected action according to the parameters formed by the user selecting one or more of the travel/activity toggles, the travel pull downs, and the time control. This causes the two shorter actions to be classified according the user-set parameters into an activity type or a travel mode. At step 2126, user-input capturer 152 merges the new actions with previous/next actions if they match the previous/next actions.

Figure 27:
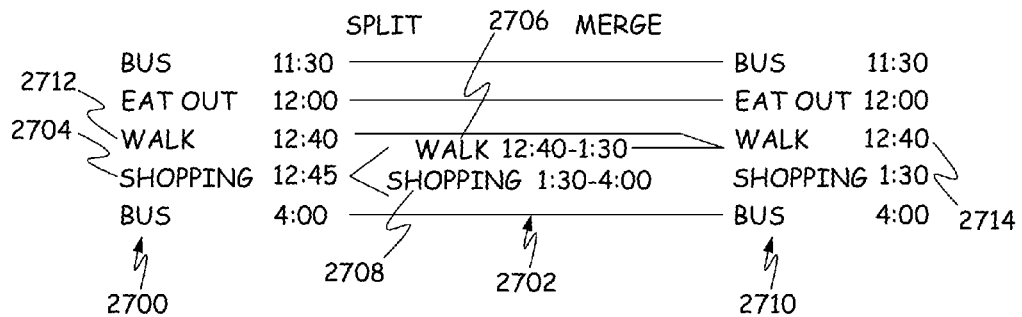
FIG. 27 provides a graph showing the splitting and merging of various periods.

FIG. 27 shows how travel modes and activities are split and merged after the split control is selected in the method of FIG. 21. In FIG. 27, the initial list of actions for a day are shown in column 2700. In column 2702, initial shopping activity 2704 is divided into a travel mode of walking 2706 and a shopping activity 2708, with the walking travel mode extending from 12:40 to 1:30 and the shopping activity extending from 1:30 to 4:00. This division can be achieved by toggling the activity control for the first action in the split user interface to trip, selecting walk as the travel mode for the trip and adjusting the time control to 1:30. Column 2710 shows a list of merged activities and travel modes after step 2126 in which trip 2712 is merged with trip 2706 to form a merged trip 2714 that extends from the beginning of trip 21712 to the beginning of activity 2708.

After the shorter actions have been merged with neighboring actions, the classifications given to the shorter actions or the merged actions are stored in activity-trip classifications 156 so that they can be used to enhance the techniques used to classify actions into activity types and travel modes. In particular, the classifications of the shorter actions and the merged actions are used to provide activities performed by the user and to retrain models used to classify actions into activity types and travel modes.

Figure 28:
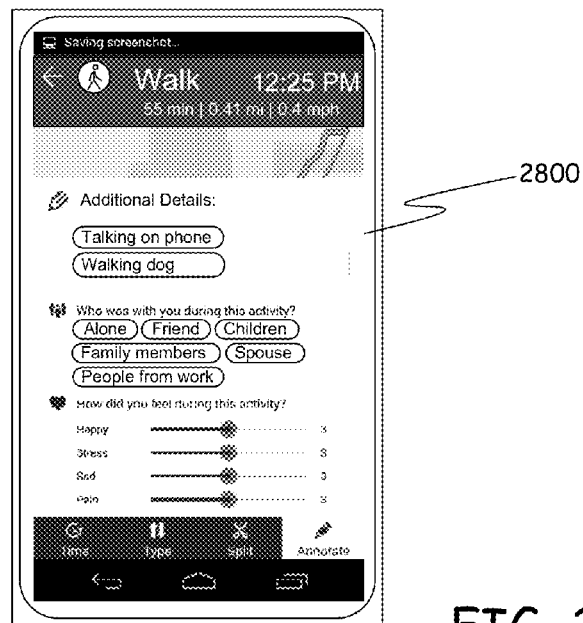
FIG. 28 provides a user interface for adding additional information about a travel period.
Figure 29:
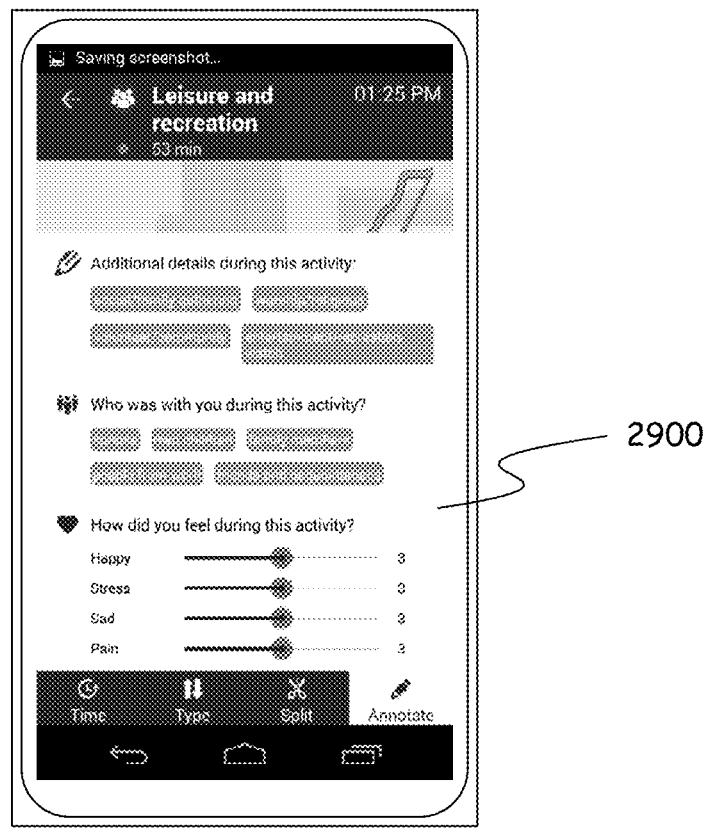
FIG. 29 provides a user interface for adding additional information about a dwelling period.

FIG. 28 and FIG. 29 provide annotation user interfaces 2800 and 2900, respectively, that allow users to add additional information about trip segments and activities. In particular, user interfaces 2800 and 2900 allow users to indicate who is traveling with them or who was taking part in the activity with them and how they were feeling during the trip or activity. In addition, travel annotation user interface 2800 allows the user to indicate if they were performing other tasks while traveling and activity annotation user interface 2900 allows the user to be more specific about the details of the activity they were performing.

Figure 30:
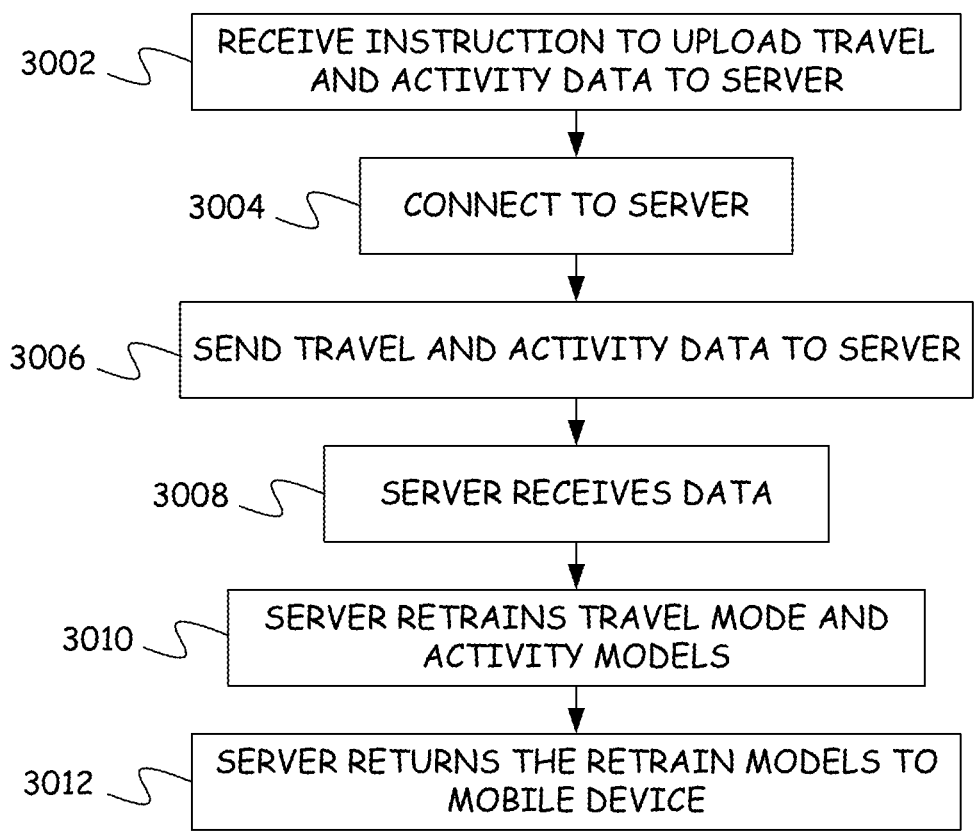
FIG. 30 provides a flow diagram for retraining and improving travel mode models and activity models for individual users.

FIG. 30 provides a flow diagram for retraining the models used to classify travel modes and activity types. At step 3002, user-input capturer 152 receives instructions to upload travel and activity data to the server, for example by receiving a selection of upload control 1404 of FIG. 14. In response, network communication interface 126 connects to server 122 at step 3004. At step 3006, network communication interface 126 sends travel and activity data to server 122 including raw motion and location data 154, activity-trip classifications 156 and user activity-trip tag data 158. This data includes indications of the correctness of the travel modes and activities identified by the models as indicated by the user when the user either accepts the predicted travel mode/activity or changes the predicted travel mode/activity through the user interfaces described above. At step 3008, server 122 receives the data. At step 3010, a classifier trainer 124 uses the data to retrain the models used by activity/trip separator 138, travel mode classifier 140 and activity type classifier 142. At step 3012, the server returns the retrained models to the mobile device, which uses the retrained models in activity/trip separator 138, travel mode classifier 140 and activity type classifier 142.

When a user alters an activity using user interface 2002 or sets an activity using splitting user interfaces 2200 or 2300, the activity set by the user is stored in activity-trip classification 156. By storing this information in activity-trip classification 156, user-input capturer 152 is acting as a classifier enhancement module that is enhancing the ability of activity type classifier 142 to properly classify activities. In particular, as mentioned above, activity type classifier 142 consults activity-trip classification 156 when attempting to identify an activity for a dwell period. By dynamically adjusting the activity associated with a location based on the user input, user-input capturer 152 is enhancing the activity type classifier 142 in real time.

Figure 31:
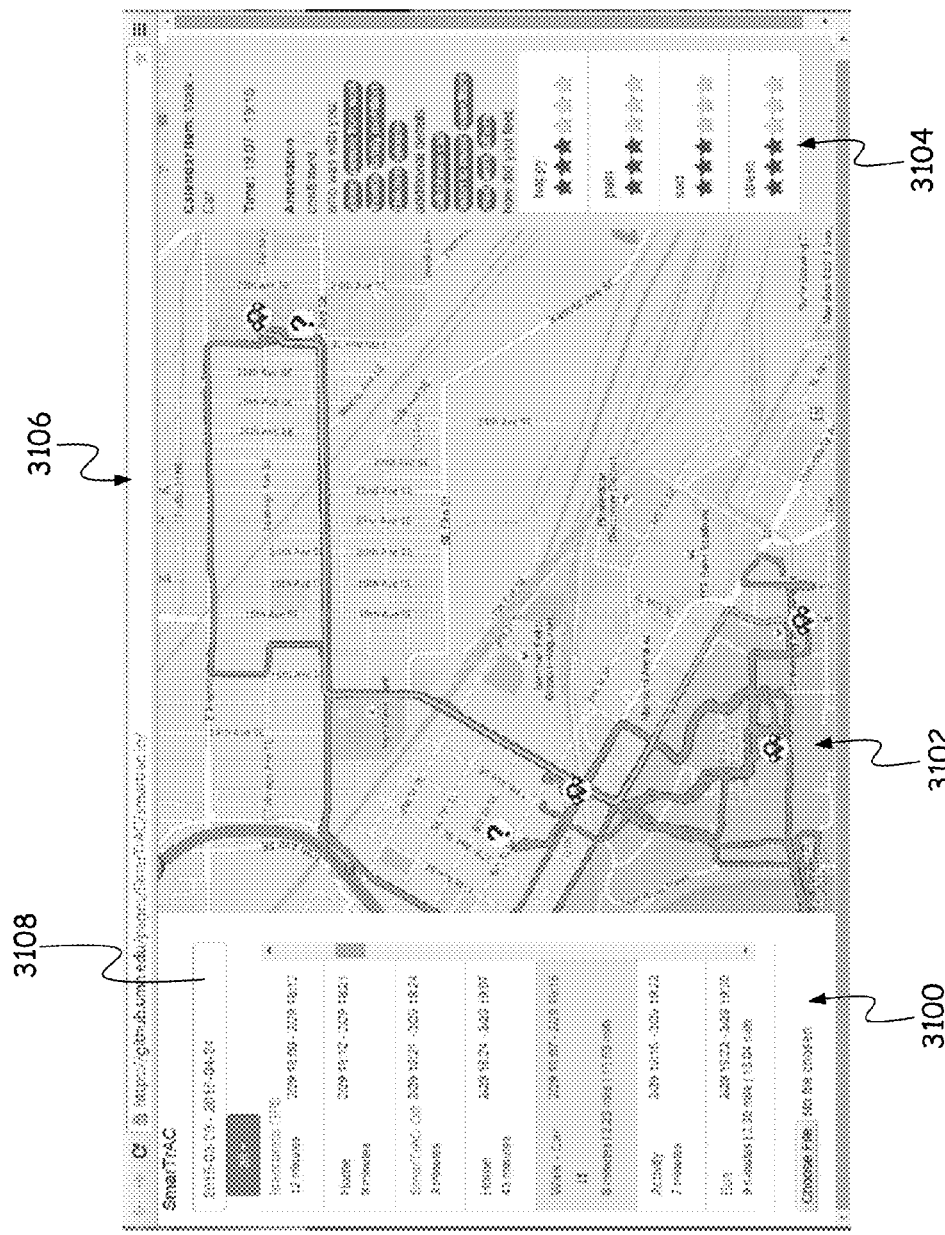
FIG. 31 provides an example user interface of a web portal designed for devices with larger screens.

FIG. 31 provides a user interface for devices with larger screens. In FIG. 31, the calendar view 3100, the map view 3102, and an annotation view 3104 are shown together on one user interface 3106. As shown in FIG. 31, calendar view 3100 and map view 3102 can each show trip and activity information for multiple days as indicated by the date range 3108 shown in calendar view 3100.

Figure 32:
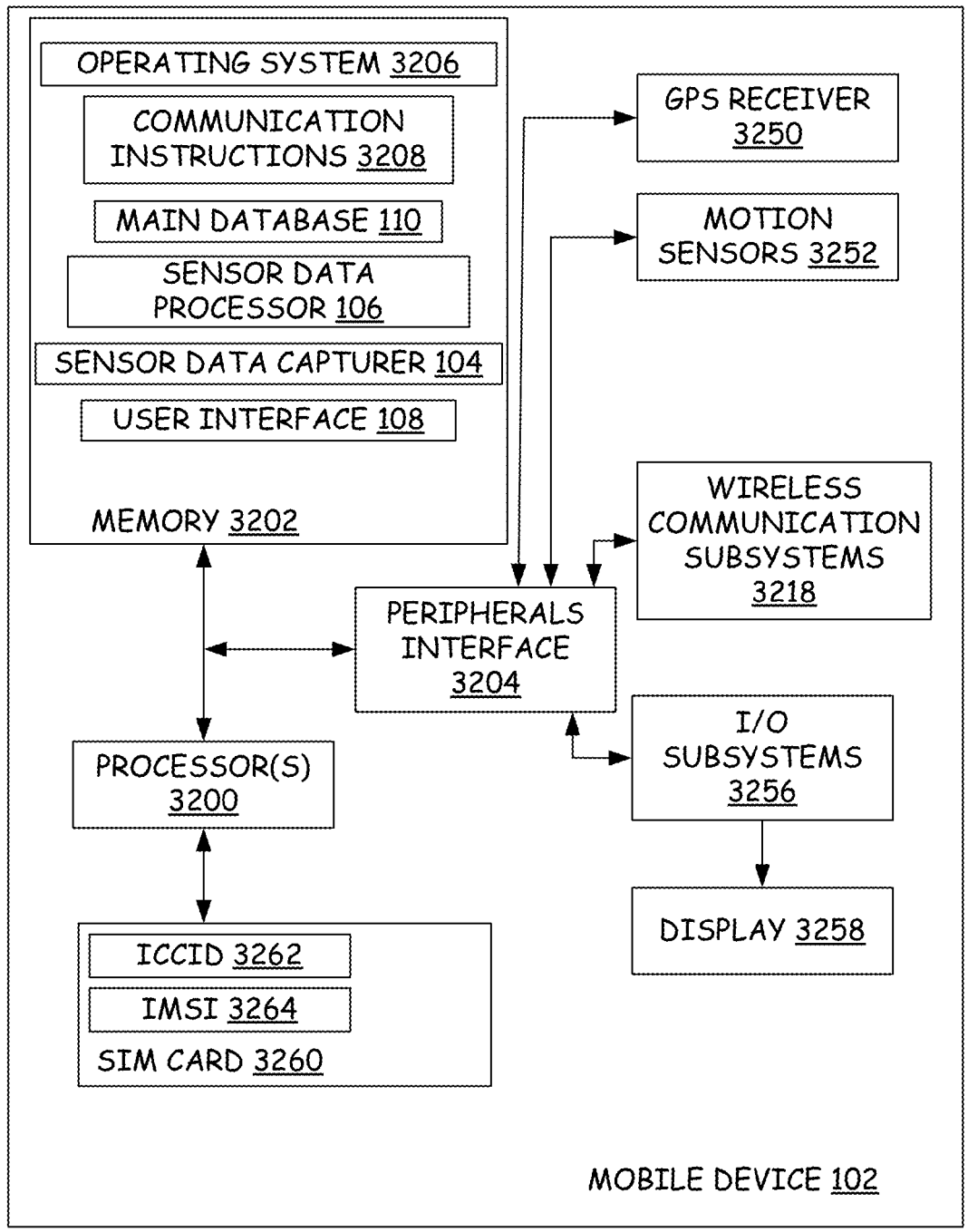
FIG. 32 provides a block diagram of a mobile device.

FIG. 32 illustrates a block diagram of mobile device 102 Mobile device 102 includes one or more processors 3200, such as a central processing unit or image processors, and a memory 3202. Processor(s) 3200 and memory 3202 are connected by one or more signal lines or buses. Memory 3202 can take the form of any processor-readable medium including a disk or solid-state memory, for example. Memory 3202 includes an operating system 3206 that includes instructions for handling basic system services and performing hardware-dependent tasks. In some implementations, operating system 3206 can be a kernel. Memory 3202 also includes various instructions representing applications that can be executed by processor(s) 3200 including communication instructions 3208 that allow processor 3200 to communicate through peripherals interface 3204 and wireless communication subsystems 3218 to a wireless cellular telephony network and/or a wireless packet switched network. Memory 3202 can also hold instructions for performing the steps executed by sensor data capturer 104, sensor data processor 106, and user interface 108 of FIG. 1. In addition, memory 3202 can hold main database 110.

Peripherals interface 3204 also provides access between processor(s) 3200 and one or more of a GPS receiver 3250, motion sensors, and input/output subsystems 3256. GPS receiver 3250 receives signals from Global Positioning Satellites and converts the signals into longitudinal and latitude information describing the location of mobile device 102 and also identifies a velocity and acceleration of mobile device 102. GPS receiver 3250 thus represents one form of positioning module 134 of FIG. 1. The position of mobile device 102 may also be determined using other positioning systems such as Wi-Fi access points, television signals and cellular grids. Motion sensors 3252 can take the form of one or more accelerometers, such as accelerometer 132 of FIG. 1, a magnetic compass, a gravity sensor and/or a gyroscope. Motion sensors 3252 provide signals indicative of movement or orientation of mobile device 102. I/O subsystems 3256 control input and output for mobile device 102. I/O subsystems 3256 can include a touchscreen display 3258, which can detect contact and movement or break thereof using any of a plurality of touch sensitivity technologies including, but not limited to capacitive, resistive, infrared and surface acoustic wave technologies as well as other proximity sensor arrays or other elements for determining one or more points of contact with display 3258. Other inputs can also be provided such as one or more buttons, rocker switches, thumb wheel, infrared port, USB port and/or pointer device such as a stylus.

Mobile device 102 can also include a subscriber identity module, which in many embodiments takes the form of a SIM card 3260. SIM card 3260 stores an ICCID 2262 and an IMSI 3264. ICCID 3262 is the Integrated Circuit Card Identifier, which uniquely identifies this card on all networks. IMSI 3264 is the international mobile subscriber identity, which identifies the SIM card on an individual cellular network. When communicating through wireless communication subsystems 3218, processor(s) 3200 can use identifiers 3262 and/or 3264 to uniquely identify mobile device 102 during communications. In accordance with many embodiments, SIM card 3260 is removable from mobile device 102 and may be inserted in other devices.

Although the present invention has been described with reference to preferred embodiments, workers skilled in the art will recognize that changes may be made in form and detail without departing from the spirit and scope of the invention.

What is claimed is:

1. A mobile device comprising:
  a positioning module sampling at least a position of the mobile device at a sampling rate when active and providing values comprising at least the position of the mobile device, wherein the positioning module provides values comprising at least one of velocity values and acceleration values for the mobile device;
  a processor generating features from the provided values, applying the features to a model to determine a travel mode for each of a collection of respective time points, and smoothing the travel modes for the collection of respective time points to identify a travel mode for a trip segment for the mobile device, wherein generating features comprises generating at least a first set of features from the values for a first time interval and a second set of features from the values for a second time interval and wherein applying the features to a model comprises applying at least the first set of features and the second set of features to the model to determine a travel mode for a single point in time.

2. The mobile device of claim 1 wherein generating the features comprises receiving a set of positions of the mobile device and removing positions from the set of positions based on at least one of an accuracy measure associated with the position, a speed of the mobile device associated with the position and an acceleration of the mobile device associated with the position and using the remaining positions in the set of positions to generate the features.

3. The mobile device of claim 1 wherein the first set of features comprises at least one set-based feature and at least one sequence-based feature.

4. The mobile device of claim 1 further comprises receiving indications from a user of the correctness of travel modes identified by the model and revising the model based on the indications.

5. The mobile device of claim 1 wherein in response to the travel mode, the processor alters the sampling rate of the positioning module.

6. The mobile device of claim 1 wherein the processor is further capable of determining that the mobile device is travelling along a known route and in response, the processor reducing the sampling rate of the positioning module.

7. The mobile device of claim 1 wherein the processor is further capable of determining that the mobile device has stopped travelling and has begun a dwelling episode and in response, the processor setting the positioning module to inactive so that it does not sample the position of the mobile device.

8. The mobile device of claim 7 wherein the processor is further capable of identifying an activity for the dwelling episode.

9. The mobile device of claim 8 wherein the processor identifies an activity for the dwelling episode by examining past activities near a location for the dwelling episode.

10. The mobile device of claim 8 wherein the processor identifies an activity for a dwelling episode by identifying labels assigned to locations near a location for the dwelling episode and using the labels to identify a most likely activity.

11. The mobile device of claim 1 wherein the mobile device further comprises a display and wherein the processor is capable of displaying the travel mode identified for the segment on a user interface on the display.

12. The mobile device of claim 11 wherein the processor is further capable of displaying a split user interface that allows a user to divide the trip segment into smaller actions and to assign at least one of a travel mode and an activity to each smaller action.

13. A memory having computer-executable instructions stored thereon, the computer-executable instructions causing a processor to execute steps comprising:
    using an accelerometer to determine that a dwelling episode has ended and in response activating a positioning module;
    identifying labels for locations around a location associated with the dwelling episode;
    using the labels to determine a most likely activity during the dwelling episode;
    collecting information comprising at least one of position information, speed information and acceleration information from the positioning module in a mobile device containing the processor;
        using the collected information to determine at least a travel mode for the mobile device;
    comparing the travel mode to a travel mode of at least one previous trip to identify a matching previous trip; and
    reducing a sampling rate of the positioning module based on identifying the matching previous trip.

14. The memory of claim 13 wherein the processor executes additional steps comprising:
    using past activities of a user of the mobile device to identify an activity to assign to the dwelling episode.

15. The memory of claim 13 wherein the processor executes additional steps comprising:
    using past activities of other users of other mobile devices to identify an activity to assign to the dwelling episode.

16. The memory of claim 13 wherein the processor executes additional steps comprising:
    determining an activity for the dwelling episode;
    generating a user interface for a display on the mobile device to show the determined activity; and
    receiving input from the user that either indicates that the user has confirmed the activity or that the user has selected a different activity for the dwelling episode.

17. The memory of claim 13 wherein the processor executes additional steps comprising:
    generating a user interface for a display on the mobile device to show a determined travel mode for a trip segment;
    receiving a selection of a control; and
    in response to selection of the control displaying a user interface that allows the user to split the trip segment into two actions.

18. A method on a mobile device, the method comprising:
    identifying a dwelling episode during which the mobile device is not considered to be traveling;
    determining a location for the dwelling episode;
    determining whether the user of the mobile device performed any activities in the past within a set distance of the location of the dwelling episode;
    when the user of the mobile device performed at least one activity in the past within the set distance of the location of the dwelling episode, classifying the dwelling episode as an activity type based on the at least one activity performed by the user in the past instead of using a more processor-intensive technique to classify the dwelling episode as an activity type; and
    when the user of the mobile device did not perform at least one activity in the past within the set distance of the location of the dwelling episode, determining labels for locations around the location of the dwelling episode and applying the labels to at least one model to predict a most likely activity type for the dwelling episode.

19. The method of claim 18 further comprising:
    while the user is traveling from the location of the dwelling episode, presenting a user interface to the user to show the activity type that the dwelling episode was classified under and allowing the user to change the activity type.

* * * * *